US009843479B2

(12) United States Patent
Rosa de Sousa Teixeira et al.

(10) Patent No.: US 9,843,479 B2
(45) Date of Patent: *Dec. 12, 2017

(54) SYSTEM AND METHOD FOR PROVIDING DYNAMIC RADIO ACCESS NETWORK ORCHESTRATION

(71) Applicant: CISCO TECHNOLOGY, INC., San Jose, CA (US)

(72) Inventors: Virginia Rosa de Sousa Teixeira, Madrid (ES); Mark Grayson, Berkshire (GB); Oliver James Bull, Bristol (GB)

(73) Assignee: Cisco Technology, Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/008,045

(22) Filed: Jan. 27, 2016

(65) Prior Publication Data

US 2016/0156503 A1    Jun. 2, 2016

Related U.S. Application Data

(63) Continuation of application No. 14/852,210, filed on Sep. 11, 2015.

(Continued)

(51) Int. Cl.
*H04W 4/00* (2009.01)
*H04L 12/24* (2006.01)
(Continued)

(52) U.S. Cl.
CPC ...... *H04L 41/0816* (2013.01); *H04L 41/0668* (2013.01); *H04L 41/5025* (2013.01);
(Continued)

(58) Field of Classification Search
None
See application file for complete search history.

(56) References Cited

U.S. PATENT DOCUMENTS 6,141,565 A    10/2000  Feuerstein et al.
6,771,934 B2    8/2004  Demers
(Continued)

FOREIGN PATENT DOCUMENTS

CN    104684052 A    6/2015
CN    105407533 A    3/2016
(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
(Continued)

*Primary Examiner* — Anh-Vu Ly
(74) *Attorney, Agent, or Firm* — Patterson + Sheridan, LLP

(57) ABSTRACT

A method is provided in one example embodiment and may include monitoring, by a radio access network (RAN) orchestration function, impairments between a plurality of candidate locations interconnected by a transport network, wherein one or more network elements capable of performing one or more operations associated with a RAN are located at the plurality of candidate locations; determining a decomposition of one or more operations associated with the RAN into a plurality of sets of virtualized network functions (VNFs) to execute the operations; determining a distribution of the plurality of sets of VNFs among the one or more network elements associated with the RAN for one or more optimal locations of the plurality of candidate locations based, at least in part, on the monitored impairments; and (Continued)

instantiating the plurality of sets of VNFs at each of the one or more optimal locations.

20 Claims, 13 Drawing Sheets

Related U.S. Application Data

(60) Provisional application No. 62/074,921, filed on Nov. 4, 2014.

(51) Int. Cl.
  *H04L 12/911* (2013.01)
  *H04W 84/04* (2009.01)
  *H04L 12/26* (2006.01)

(52) U.S. Cl.
  CPC ............ *H04L 43/08* (2013.01); *H04L 47/828* (2013.01); *H04W 84/042* (2013.01); *H04L 41/0893* (2013.01); *H04L 41/0896* (2013.01); *H04L 41/5035* (2013.01); *H04L 41/5051* (2013.01); *H04L 43/0817* (2013.01); *H04L 43/0823* (2013.01); *H04L 43/0829* (2013.01); *H04L 43/0852* (2013.01); *H04L 43/0888* (2013.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,510,237 B2 | 11/2016 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1 | 12/2010 | Gerstenberger |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marsico |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |

(56) References Cited

U.S. PATENT DOCUMENTS

| | | |
|---|---|---|
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063166 A1 | 3/2015 | Sif |
| 2015/0063223 A1 | 3/2015 | Shen |
| 2015/0063231 A1 | 3/2015 | Seo et al. |
| 2015/0078162 A1 | 3/2015 | Prakash et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0256314 A1 | 9/2015 | Gauvreau et al. |
| 2015/0288767 A1 | 10/2015 | Fargano |
| 2015/0289167 A1 | 10/2015 | Alex |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0373698 A1 | 12/2015 | Uplenchwar et al. |
| 2015/0382242 A1 | 12/2015 | Sunavala |
| 2015/0382367 A1 | 12/2015 | Yanover et al. |
| 2016/0037550 A1 | 2/2016 | Barabell |
| 2016/0043944 A1 | 2/2016 | Felstaine |
| 2016/0073426 A1 | 3/2016 | Bull et al. |
| 2016/0100330 A1 | 4/2016 | Broustis |
| 2016/0191345 A1 | 6/2016 | Despotovic |
| 2016/0277953 A1 | 9/2016 | Andersson |
| 2016/0344587 A1 | 11/2016 | Hoffmann |
| 2017/0019811 A1 | 1/2017 | Parulkar |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2832150 | 2/2015 |
| EP | 2879444 | 6/2015 |
| EP | 2996422 | 3/2016 |
| EP | 3119036 | 1/2017 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/006769 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/051630 | 4/2014 |
| WO | WO2014/059935 | 4/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

(56) References Cited

OTHER PUBLICATIONS

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125.215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: Lte; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route de Lucioles F-06921 Sophia Antipolis Cedex—France, Oct. 2015 [Sections 1 thru 9 only]; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0

(56) References Cited

OTHER PUBLICATIONS

Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access

(56) References Cited

OTHER PUBLICATIONS (E-UTRA); Further advancements for E-UTRA physical layer aspects (Release 9);" 3rd Generation Partnership Project (3GPP), Mar. 2010.

"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucidoles, F-06921, Sophia Antipolis Cedex—France, Jun. 2014; See Sections 1-5, pp. 11-76.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Luciodes, F-06921, Sophia Antipolis Cedex—France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Center; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 640 Route Des Lucioles; F-06921 Sophia-Antipolis Cedex; France Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

(56) References Cited

OTHER PUBLICATIONS

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.

Basir, Adnan, "3GPP Long Term Evolution (LTE), ICIC and eICIC," posted Jun. 11, 2012; 5 pages; http://4g-lte-world-blogspot.com/2012/06/icic-and-eicic.html.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_nneas_wblerror_desc.html.

"Broadband Forum Technical Report: TR-069 CPE WAN Management Protocol," Issue: 1, Amendment 4, Issue Date: Jul. 2011 Protocol Version 1.3; © The Broadband Forum; 190 pages.

"Broadband Forum Technical Report: TR-069 CPE WAN Management Protocol," Issue: 1, Amendment 5, Issue Date: Nov. 2013 CWMP Version 1.4; © The Broadband Forum; 228 pages.

"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.

Droms, R., "Dynamic Host Configuration Protocol," Network Working Group RFC 2131, Mar. 1997; 45 pages.

"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.

Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.

"Frame Structure—Downlink," Share Technote, first published on or about Jul. 9, 2012; 13 pages; http://www.sharetechnote.com/html/FrameStructure_DL_.html.

"Fuzzy Logic," from Wikipedia, the free encyclopedia, Dec. 3, 2015; 12 pages.

Freescale Semiconductor, "Long Term Evolution Protocol Overview," White Paper, Document No. LTEPTCLOVWWP, Oct. 2008; 21 pages.

Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.

Goldsmith, A.J., et al., "Variable Rate Variable-Power MQAM for Fading Channels," IEEE Trans. on Comm. vol. 45, No. 10, Oct. 1997.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Olulun Yliopisto, University of OULU, Department of Computer Science and Engineering; Oct. 2013, 66 pages.

Holbrook, H., et al., "Source-Specific-Multicast for IP," Network Working Group RFC 4607, Aug. 2006.

Horn, Gavin, "3GPP Femtocells: Architecture and Protocols," Qualcomm Incorporated, 5775 Morehouse Drive, San Diego, CA, Sep. 2010; 64 pages.

"Hysteresis," from Wikipedia, the free encyclopedia; Oct. 1, 2015.

"Hybrid Automatic Repeat Request," from Wikipedia, the free encyclopedia, Jun. 8, 2015; 4 pages.

Ku, Gwanmo, "Resource Allocation in LTE," Adaptive Signal Processing and Information Theory Research Group, Nov. 11, 2011; 33 pages.

Kwan, R., et al., "A Survey of Scheduling and Interference Mitiation in LTE," vol. 2010, Article ID 273486, May 30, 2010.

Kwan, R., et al., "On Radio Admission Control for LTE Systems," Proc. of IEEE VTC-fail, Sep. 6-9, 2010.

La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.

Leung, K., et al., "WiMAX Forum/3GPP2 Proxy Mobile IPv4," Independent Submission RFC 5563, Feb. 2010; 41 pages.

Lopez-Perez, D., et al., "Interference Avoidance and Dynamic Frequency Planning for WiMAX Femtocells Networks," Proceedings of ICCS, Jun. 23-25, 2008.

LteWorld, "Packet Data Convergence Protocol (PDCP)," Information Page, LteWorld.org, published on or about Jan. 2, 2013; 2 pages.

"Link Layer Discovery Protocol," Wikipedia, the free encyclopedia, 4 pages, [Retrieved and printed Nov. 17, 2013]; http://en.wikipedia.org/wiki/Link_Layer_Discovery_Protocol.

"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.

"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.

"LTE Layers Data Flow," LTE Tutorial, tutorialspoint; first published on or about Jan. 17, 2013; 3 pages; http://www.tutorialspoint.com/lte/lte_layers_data_flow.htm.

"LTE Protocol Stack Layers," LTE Tutorial, tutorialspoint; first published on or about Jan. 16, 2013 http://www.tutorialspoint.com/lte/lte_protocol_stack_layers.htm.

"LTE Quick Reference," from Share Technote; first published on or about Nov. 28, 2012; http://www.sharetechnote.com/html/Handbook_LTE_RNTI.html.

"LTE Quick Reference: CCE Index Calculation," LTE Handbook, Share Technote, first published on or about Jul. 8, 2012 http://www.sharetechnote.com/html/Handbook_LTE_CCE_Index.html.

(56) References Cited

OTHER PUBLICATIONS

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.

"LTE TDD Overview," from ShareTechnote; first published on or about Jul. 2, 2014 http://www.sharetechnote.com/html/LTE_TDD_Overview.html.

Madan, Ritesh, et al., "Fast Algorithms for Resource Allocation in Wireless Cellular Networks," IEEE/ACM Transactions on Networking, vol. 18, No. 3, Jun. 2010; 12 pages.

Mehlfuhrer, M., et al., "Simulating the Long Term Evolution Physical Layer," Proc. of 17th European Signal Processing Conference (EUSIPCO), Aug. 24-28, 2009.

Narten T., et al., "Neighbor Discovery for IP version 6 (IPv6)," Network Working Group RFC 4861, Sep. 2007; 97 pages.

NGMN Alliance, "Further Study on Critical C-RAN Technologies," Next Generation Mobile Networks, Mar. 31, 2015; 93 pages.

Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.

Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.

Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.

Park, Jeongho, et al., "Interference Level Control in Mobile WiMAX Uplink System," 2009 IEEE Mobile WiMAX Symposium, Jul. 9-10, 2009; 5 pages.

"Paging Channel Selection," UMTS World; first published on or about Jun. 22, 2003; 3 pages; http://www.umtsworld.com/technology/paging.html.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"PDCCH Processing," published by Gio Zakradze on Dec. 29, 2014; 56 pages.

"Plane (in networking)," Definition from WhatIs.com; Jan. 2013 http://whatis.techtarget.com/definition/plane-in-networking.

Piro, G., et al., "An LTE module for the ns-3 Network Simulator," in Proc. of Wns3 2011 (in conjunction with SimuTOOLS 2011), Mar. 2011, Barcelona Spain.

"QoS Class Identifier," from Wikipedia, the free encyclopedia, Oct. 7, 2015.

"RADIUS," Wikipedia, the free encyclopedia, 12 pages [Retrieved and printed Oct. 11, 2013] http://en.wikipedia.org/wiki/RADIUS.

"Received signal strength indication," Wikipedia, the free encyclopedia, Dec. 22, 2014; 2 pages.

Rengarajan, Balaji, "A Semi-autonomous Algorithm for Self-organizing Dynamic Fractional Frequency Reuse on the Uplink of OFDMA Systems," Dec. 14, 2009; 22 pages.

"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.

Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.

Saad, Sawsan A., et al., "A Survey on Power Control Techniques in Femtocell Networks," Journal of Communications vol. 8, No. 12, Dec. 2013; 10 pages.

Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.

Seo, H., et al., "A proportional-fair power allocation scheme for fair and efficient multiuser OFDM systems," in Proc. of IEEE GLOBECOM, Dec. 2004, Dallas (USA).

Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800 ISBN:978-1-4244-9722-5 p. 1563-p. 1565.

Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.

Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.

Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.

Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.

"Transmission Time Interval," from Wikipedia, the free encyclopedia, May 2, 2013.

UKIPO Mar. 27, 2012 Search Report from GB Patent Application Serial No. GB1120462.5.

UKIPO Jan. 19, 2013 Search Report from GB Patent Application Serial No. GB1120462.5.

UKIPO Dec. 20, 2013 Search Report from GB Application Serial No. GB1312321.1, 6 pages.

Wanda, Alex, "UMTS UTRAN Block Error Rate (BLER) Measurements," Telecom Insights, Jan. 2011; 3 pages http://trends-in-telecoms.blogspot.corn/2011/01/umts-utrans-block-error-rate-rate-bler.html.

Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.

Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.

"Whats is Uplink RSSI in LTE," TelecomSource thread, May 22, 2013; 5 pages http://www.telecomsource.net/howthread.php?5464-Whats-is-Uplink-RSSI-in-LTE.

Xiong, Chao, "Enhanced ICIC for LTE-A HetNet," ZTE Corporation, LTE World Summit 2012, May 2012; 3 pages.

Zyren, Jim, "Overview of the 3GPP Long Term Evolution Physical Layer," White Paper, Freescale Semiconductor, Document No. 3GPPEVOLUTIONWP; Jul. 2007; 27 pages.

EPO Aug. 12, 2014 Extended EPO Search Report and Opinion from European Application Serial No. 13195780.8.

EPO Nov. 19, 2015 Extended Search Report and Written Opinion from European Application EP13767700; 9 pages.

EPO Mar. 26, 2015 Extended Search Report and Opinion from European Application Serial No. EP14190541.

PCT Jul. 16, 2013 International Search Report and Written Opinion from International Application PCT/IL2013/050269, 3 pages.

(56) References Cited

OTHER PUBLICATIONS

PCT Oct. 1, 2014 International Preliminary Report on Patentability from International Application PCT/IL2013/050269, 4 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application No. 15183582.4.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
"Cisco's One Platform Kit (onePK)," Networking Software (IOS & NX-OS), Cisco Systems, Inc., First published on or about Mar. 3, 2014; 2 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
Ericsson, et al., "LPN Range Expansion in Co-Channel Deployment in Heterogeneous Networks," 3GPP Draft R1-125219, 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
Nokia Corporation, et al., "SON WI Status Overview, 3GPP Draft R2-093231," 3rd Generation Partnership Project (3GPP), Mobile Competence Centre; 650; Route Des Lucioles; F-06921 Sophia-Antipolis; Apr. 2009.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.

EPO Jul. 29, 2014 Extended Search Report from European Application Serial No. EP13195673, 12 pages.
PCT Mar. 17, 2014 International Search Report and Written Opinion from International Application Serial No. PCT/IL2013/000086, 12 pages.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013, 10 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Wubben, Dirk, et al., "Benefits and Impact of Cloud Computing on 5G Signal Processing," IEEE Signal Processing Magazine, Nov. 2014.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/479,343, filed Sep. 7, 2014, entitled "Operation of Base Station in a Celllular Communication Network," Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 15/008,045, filed Jan. 27, 2016, entitled "System and Method for Providing Dynamic Radio Access Network Orchestration," Inventors: Virginia Rosa de Sousa Teixeira, et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/961,552, filed Dec. 7, 2015, entitled "System and Method to Provide Uplink Interference Coordination in a Network Environment," Inventor: Ritesh K. Madan.

(56) References Cited

OTHER PUBLICATIONS

U.S. Appl. No. 14/993,859, filed Jan. 12, 2016, entitled "System and Method to Facilitate Centralized Radio Resource Management in a Split Radio Access Network Environment," Inventor: Ritesh K. Madan.

U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.

U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.

U.S. Appl. No. 15/018,677, filed Feb. 8, 2016, entitled "Mitigation of Uplink Interference Within Heterogeneous Wireless Communications Networks," Inventor: Pankaj Uplenchwar, et al.

U.S. Appl. No. 15/089,252, filed Apr. 1, 2016, entitled "Method and System for Dynamic Allocation of Resources in a Cellular Network," Inventors: Vladimir Yanover, et al.

U.S. Appl. No. 15/071,724, filed Mar. 16, 2016, entitled ""Power Setting,"" Inventor: Pankaj Uplenchwar, et al.

USPTO Jan. 20, 2017 Non-Final Office Action from U.S. Appl. No. 14/852,210.

EPO Oct. 24, 2016 Extended Search Report and Written Opinion of the International Searching Authority from European Application No. 16178746.

|       | LOC 1 | LOC 2 | LOC 3 | LOC 4 | LOC 5 | LOC 6 | LOC 7 |
|-------|-------|-------|-------|-------|-------|-------|-------|
| LOC 1 | *     | $I_{1,2}$ | $I_{1,3}$ | $I_{1,4}$ | $I_{1,5}$ | $I_{1,6}$ | $I_{1,7}$ |
| LOC 2 | *     | *     | $I_{2,3}$ | $I_{2,4}$ | $I_{2,5}$ | $I_{1,6}$ | $I_{1,7}$ |
| LOC 3 | *     | *     | *     | $I_{3,4}$ | $I_{3,5}$ | $I_{3,6}$ | $I_{3,7}$ |
| LOC 4 | *     | *     | *     | *     | $I_{4,5}$ | $I_{4,6}$ | $I_{4,7}$ |
| LOC 5 | *     | *     | *     | *     | *     | $I_{5,6}$ | $I_{5,7}$ |
| LOC 6 | *     | *     | *     | *     | *     | *     | $I_{6,7}$ |
| LOC 7 | *     | *     | *     | *     | *     | *     | *     |

610.1

612

| $I_{N,M}$ | : | $I.1_{N,M}$ | $I.2_{N,M}$ | $I.3_{N,M}$ | ○ ○ ○ | $I.X_{N,M}$ |

614

FIG. 6B

SYSTEM AND METHOD FOR PROVIDING DYNAMIC RADIO ACCESS NETWORK ORCHESTRATION

CROSS-REFERENCE TO RELATED APPLICATION

This application is a continuation (and claims the benefit of priority under 35 U.S.C. §120) of U.S. application Ser. No. 14/852,210, filed Sep. 11, 2015, entitled "SYSTEM AND METHOD FOR PROVIDING DYNAMIC RADIO ACCESS NETWORK ORCHESTRATION," Inventors Virginia Rosa de Sousa Teixeira, et al. The disclosure of the prior application is considered part of (and is incorporated in its entirety by reference in) the disclosure of this application. This application claims the benefit of priority under 35 U.S.C. §119(e) to U.S. Provisional Application Ser. No. 62/074,921, entitled "SYSTEM AND METHOD FOR PROVIDING DYNAMIC RADIO ACCESS NETWORK ORCHESTRATION" filed Nov. 4, 2014, which is hereby incorporated by reference in its entirety.

TECHNICAL FIELD

This disclosure relates in general to the field of communications and, more particularly, to a system and method for providing dynamic Radio Access Network (RAN) orchestration in a network environment.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication resources becomes more critical. In some instances, network service providers desire to manage RAN functionality across a communication system. However, there are significant challenges in managing RAN functionality across a communication system, particularly with regard to timing constraints between RAN components and transport network components of the communication system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6B is a simplified example table illustrating example details that can be associated with an example characterization of impairments between locations associated with an example RAN interconnected by a transport network;

DETAILED DESCRIPTION OF EXAMPLE EMBODIMENTS

Overview

Figure 1:
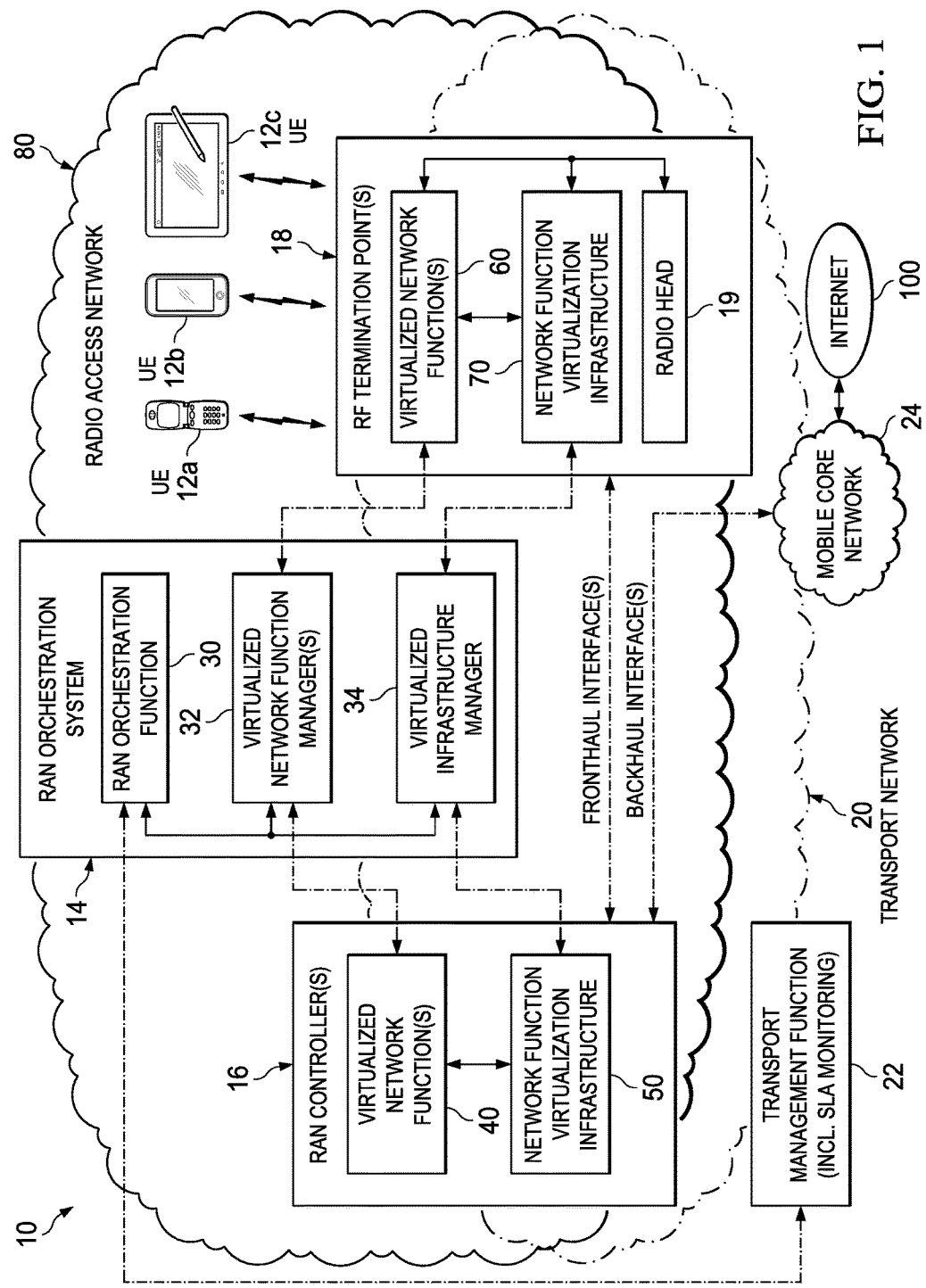
FIG. 1 is a simplified block diagram illustrating a communication system to facilitate providing dynamic RAN orchestration according to one embodiment of the present disclosure.

A method is provided in one example embodiment and may include monitoring, by a radio access network (RAN) orchestration function, impairments between a plurality of candidate locations interconnected by a transport network, wherein one or more network elements capable of performing one or more operations associated with a RAN are located at the plurality of candidate locations; determining a decomposition of one or more operations associated with the RAN into a plurality of sets of virtualized network functions (VNFs) to execute the operations based, at least in part, on the monitored impairments; determining a distribution of the plurality of sets of VNFs among the one or more network elements associated with the RAN for one or more optimal locations of the plurality of candidate locations based, at least in part, on the monitored impairments; and instantiating the plurality of sets of VNFs at each of the one or more optimal locations. In some cases, network elements associated with the RAN include one or more of: one or more Radio Frequency (RF) termination points; and one or more data centers.

In some cases, the method can include configuring a plurality of orchestration policies for the RAN orchestration function, wherein each orchestration policy identifies a particular decomposition of one or more operations associated with the RAN into particular sets of VNFs based, at least in part, on particular impairments that can be present between the plurality of candidate locations interconnected by the transport network. In some instances, determining the distribution of the plurality of sets of particular VNFs for the one or more optimal locations can include identifying, one or more optimal locations at which to distribute one or more sets of VNFs for executing operations that are associated with one or more of: Layer 1 (L1) RAN control operations; Layer 2 (L2) RAN control operations; and Layer 3 (L3) RAN control operations. In some instances, identifying the one or more optimal locations at which to distribute the one or more sets of VNFs can include determining network element capabilities for the network elements capable of performing the one or more operations associated with the RAN located at the plurality of candidate locations.

In still some cases, the method can include monitoring user equipment (UE) demand associated with one or more of the plurality of candidate locations. In some instances, determining the decomposition of the one or more operations associated with the RAN can be based additionally on changes in UE demand at one or more of the plurality of candidate locations. In some instances, determining the distribution of the plurality of sets of VNFs can be based additionally on changes in UE demand at one or more of the plurality of locations.

In still some cases, the method can include generating RAN feedback information including one or more of: information associated with a particular decomposition and a particular distribution; and communicating the RAN feedback information to a transport management function associated with the transport network.

A system is provided in one example embodiment and may include a Radio Access Network (RAN) orchestration system comprising: at least one memory element; at least one processor; and a RAN orchestration function adapted when executed by the at least one processor to: monitor impairments between a plurality of candidate locations interconnected by a transport network, wherein one or more network elements capable of performing one or more operations associated with a RAN are located at the plurality of candidate locations; determine a decomposition of one or more operations associated with the RAN into a plurality of sets of virtualized network functions (VNFs) to execute the operations based, at least in part, on the monitored impairments; determine a distribution of the plurality of sets of VNFs among the one or more network elements associated with the RAN for one or more optimal locations of the plurality of candidate locations based, at least in part, on the monitored impairments; and instantiate the plurality of sets of VNFs at each of the one or more optimal locations.

In some cases, the RAN orchestration system can further include a virtualized infrastructure manager (VIM) adapted when executed by the at least one processor to manage resources for a Network Function Virtualization Infrastructure (NFVI) for each of the plurality of sets of VNFs. In still some cases, the RAN orchestration system can further include at least one VNF manager adapted when executed by the at least one processor to manage instantiation of the plurality of sets of VNFs at each of the one or more optimal locations.

Example Embodiments

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), virtualized functionality and/or any virtualized network controller, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). A VNFC can be an internal component of a VNF, which can provide a VNF provider a defined subset of that VNF's functionality. As referred to herein in this Specification, the term 'decomposition' and variations thereof can be used to indicate a logical separation of various VNFs, each of which can perform certain specialized operations, among one or more virtualized network controller(s), module(s), aggregator(s), combinations thereof or any other network element that may be associated with any given virtualized network environment. A given decomposition can be realized, in an operational sense, by instantiating VNFs associated with the decomposition to execute the specialized operations as configured for the VNFs.

Turning to FIG. 1, FIG. 1 is a simplified block diagram illustrating a communication system 10 to facilitate providing dynamic RAN orchestration according to one embodiment of the present disclosure. This particular configuration may be tied to the 3rd Generation Partnership Project (3GPP) Evolved Universal Mobile Telecommunications System (UMTS) Terrestrial radio access network (E-UTRAN) architecture, which can interface with a Long Term Evolution (LTE) Evolved Packet System (EPS) core. Alternatively, the depicted architecture may be applicable to other environments equally.

The example architecture of FIG. 1 may include or more user equipment (UE) 12*a*-12*c*, a Radio Access Network (RAN) 80 (solid line cloud), which may interface with a RAN orchestration system (ROS) 14, one or more RAN controller(s) 16, one or more Radio Frequency (RF) termination point(s) 18, a transport network 20 (dash-dot line cloud), which may interface with a transport management function 22, and a mobile core network 24. Also shown in FIG. 1 is an internet 100, which may be associated with any packet data network (PDN) in various embodiments. RAN orchestration system 14 may include a RAN orchestration function 30, which may interface with one or more virtualized network function (VNF) Manager(s) 32 and a virtualized infrastructure manager (VIM) 34.

Note, although only one RF termination point(s) 18 is shown in FIG. 1, it should be understood that multiple RF termination points 18 can be distributed throughout RAN 80 for communication system 10. Additionally, although only one RAN controller(s) 16 is shown in FIG. 1, it should be understood that multiple RAN controllers 16 can be distributed among different network elements associated with RAN 80 at different locations throughout RAN 80 interconnected via transport network 20. As described in further detail herein, other network elements may be present within communication system 100 according to various embodiments of the present disclosure. For various embodiments described herein, the '(s)' nomenclature is used to indicate 'one or more'.

Each RAN controller(s) 16 can include a set of one or more VNF(s) 40, which may interface with VNF Manager(s) 32, and may also include a Network Function Virtualization Infrastructure (NFVI) 50 associated with the set of VNF(s) 40, which may interface with VIM 34 and VNF(s) 40. In various embodiments, the set of VNF(s) 40 can be instantiated at one or more location(s) of interconnected network elements of RAN 80 including RF termination point(s) 18 (e.g., RAN controller(s) 16 could be configured at the location(s) of RF termination point(s) 18) or any other location(s) of any other interconnected network elements that can be associated with RAN 80 including, but not limited to, a centralized data center such as, for example, an enterprise data center or a service provider data center, either of which can be realized in a cloud-based architecture. Each RF termination point(s) 18 may include a set of one or more VNF(s) 60, which may interface with VNF Manager(s) 32, may also include an NFVI 70 associated with VNF(s) 60, which may interface with VIM 34 and VNF(s) 60, and also includes a radio head 19, which may interface with the set of one or more VNF(s) 60 and NFVI 70. Note a set of VNF(s) can include one VNF.

RAN orchestration system 14, via RAN orchestration function 30, may interface with transport management function 22 in order to exchange communications between RAN 80 and transport network 20. The interface (dash-dot line) interconnecting RAN orchestration function 30 and transport management function 22 can be provided via transport network 20. In various embodiments, transport management function 22 may include functionality for monitoring one or more Service Level Agreement(s) (SLA(s)) and, when applicable, for enforcing command and/or control of the transport network 20.

In general, RAN 80 may provide a communications interface between UE 12a-12c and mobile core network 24 and/or internet 100 for one or more 3GPP and/or non-3GPP Internet protocol (IP) access networks. In various embodiments, 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). In various embodiments, non-3GPP IP access networks can include wireless local access networks (WLANs) such as WiFi, Worldwide Interoperability for Microwave Access (WiMAX), Bluetooth™ or the like.

RF termination point(s) 18 can offer any suitable over-the-air radio access connectivity to one or more UE (e.g., UE 12a-12c) using any appropriate protocol or technique via radio head 19. In various embodiments, radio head 19 can include circuitry, hardware, software, firmware, combinations thereof or the like to provide one or more radio transmitters and receivers to facilitate over-the-air radio access connectivity. As referred to herein in this Specification, over-the-air radio access connectivity may be generally referred to as a 'link'. Note that an 'RF termination point' (e.g., RF termination point(s) 18) can also be referred to interchangeably in this Specification as a 'cell', 'radio access point' or 'base station'. In various embodiments, RF termination point(s) 18 can be include any subset of base station functionalities, such as for example, Evolved Node B (eNodeB) functionalities, Home eNodeB (HeNB) functionalities, Node B (NodeB) functionalities, Radio Network Controller (RNC) functionalities, Home NodeB (HNB) functionalities, base transceiver station (BTS) functionalities, WiFi access point functionalities, Bluetooth™ access point functionalities, WiMAX access point functionalities, combinations thereof or the like.

The architecture of communication system 10 is equally applicable to small cell architectures and macro cell architectures that can be deployed within RAN 80. Small cells (e.g., HeNBs for 4G/LTE, HNBs for 3G) operate in a similar manner to macro cells (e.g., eNodeBs for 4G/LTE, NodeBs for 3G) but typically at a lower transmission power, thereby creating smaller coverage areas in which to serve UE. Small cell networks (e.g., grids or clusters of small cells) are typically deployed in enterprise or residential environments where coverage of macro cells is limited (e.g., by walls, roofs, etc.).

In various embodiments, mobile core network 24 may include one or more network elements such as, for example, one or more Serving General Packet Radio Service (GPRS) Support Nodes (SGSNs) and one or more Gateway GPRS support nodes (GGSNs), one or more Packet Data Network (PDN) gateways (PGWs), one or more Mobility Management Entities (MMEs), one or more serving gateways (SGWs), one or more Policy and Charging Rules Functions (PCRFs), one or more Authentication, Authorization and Accounting (AAA) elements, a Home Subscriber Server/Home Location Register (HSS/HLR), etc. to provide connectivity for UE 12a-12c to one or more external PDNs, such as internet 100, to implement QoS on packet flows, to provide enhanced services to UE 12a-12c, stateful firewalls, Traffic Performance Optimization (TPO), etc. Mobile core network 24 may also include components to provide access for non-3GPP IP access networks. In various embodiments these components can include but not limited to one or ePDGs, one or more SaMOG access gateways (AGWs), combinations thereof or the like. Note the term 'SaMOG' as may refer S2a Mobility based on general packet radio service (GPRS) tunneling protocol (GTP), which may define interworking between a WLAN and 3GPP access systems, such as LTE. These elements are not shown in order to illustrate other features of communication system 10.

Transport network 20 may include all the infrastructure (e.g., associated network elements and communication links) to provide at least one differentiated, secure, reliable and manageable communication channel to provide: 1) interconnections, shown in FIG. 1 as fronthaul interface(s) (dash-dot lines), between RAN 80 network elements (e.g., RAN controller(s) 16, RF termination point(s) 18, etc.) for various RAN decompositions, which can be realized across different geographic locations within communication system 10; 2) general interconnections among other network elements distributed throughout or interconnected with RAN 80 (e.g., between RAN orchestration system 14 and transport management function 22, RAN controller(s) 16, RF termination point(s) 18 or any other network element may be present); 3) interconnections between RAN 80 network elements and network elements of mobile core network 24 (e.g., MME, SGW, ePDG, HNB-GW, HeNB-GW, etc., which can also be deployed, instantiated, etc. among different geographic locations), shown in FIG. 1 as a backhaul interface(s) (dash-dot line) between RAN controller(s) 16 and mobile core network 24 (e.g., there could be multiple RAN controllers 16, each having one or more backhaul interfaces to mobile core network 24), and/or 4) other network services such as, for example, RAN synchronization over heterogeneous transport technologies. In various embodiments, interconnections can include interfaces and/or points of connection that can be wired, wireless, physical and/or virtual among physical and/or virtual network elements interconnected and/or accessible by transport network 20.

The term 'fronthaul' is used herein in this Specification to describe interfaces provided via transport network 20 that interconnect network elements of any virtualization architecture for RAN 80, which may include different decompositions of sets of VNFs for RAN 80. The term 'backhaul' may be used herein to describe interface(s) provided via transport network 20 to interconnect network elements of any RAN 80 architecture (virtualized and non-virtualized) and network elements of mobile core network 24.

In some embodiments, transport network 20, via transport management function 22, can include real-time mechanisms to measure various transport network parameters, or more generally, performance or performance indicators, in order to characterize the transport network and to dynamically adjust the transport flows (e.g., user data traffic, control traffic) as commanded by the transport management function 22. As referred to herein in this specification, operations associated with measuring transport network performance or performance indicators among various locations of transport network 20 can be referred to as transport network 20 'characterization'. In some embodiments, fronthaul characterizations can be performed to characterize portions of the transport network 20 interconnecting network elements of RAN 80. In various embodiments, transport network parameters that can be measured for transport network 20 can include bidirectional path characteristics such as, for example, throughput, delay, jitter (e.g., variance of delay) loss, etc. Throughput, delay, jitter, loss or any other transport network parameters that can be measured for transport network 20 characterizations (e.g., fronthaul characterizations) be can be referred to herein collectively as 'impairments'.

Before detailing some of the operational aspects of FIG. 1, it is important to understand common characteristics of RAN virtualization and cloudification. The following foundation is offered earnestly for teaching purposes only and, therefore should not be construed in any way to limit the broad teachings of the present disclosure. RAN virtualization and cloudification is a hot topic and is introducing the concept of fronthaul networks into virtualized RAN architectures.

Fronthaul characterizations can play an important role in determining how RAN functionality can be virtualized among different possible decompositions. Typically, RAN functionality is virtualized for deployments in which 'ideal' fronthaul networks can be deployed. By 'ideal' it is meant that ideal fronthaul bandwidth and latency requirements can be met for a deployment. In the future, however, there may be new RAN decompositions that can operate over non-ideal fronthaul networks. For example, standards may define a plurality of decompositions that have associated requirements in terms of fronthaul characteristics. Additionally, the characteristics of a given transport network may be such that a fronthaul realization cannot be supported and instead a traditional distributed-RAN/backhaul approach may need to be used. Further, the characteristics of the transport network may change, e.g., due to failure scenarios and other impairments. This may then result in a transport network that was previously characterized as capable of supporting an 'ideal fronthaul' to then be characterized as capable of supporting 'non-ideal fronthaul' or even an 'impaired backhaul' network.

Dynamic re-characterizations (e.g., cyclic characterizations, characterizations triggered by some network event, etc.) of a given transport network can result in decompositions of RAN functionality to be adapted according to the re-characterizations. This dynamic nature of RAN decomposition presents an opportunity to manage the RAN distribution based not only transport network performance, but also the demand presented by UE in the communication system.

In accordance with one embodiment, communication system 10 may provide a system and method to facilitate determining, via RAN orchestration system 14 and transport management function 22, decompositions or 'flavors' of decompositions of sets of virtualized network functions that can be distributed across network elements of RAN 80 interconnected among transport network 20 to perform one or more operations associated with RAN 80 and also determining locations at which the sets of virtualized network functions for the network elements of RAN 80 can be instantiated in order to optimize RAN 80 operation according to various fronthaul interface characterizations and/or UE demand within RAN 80. During operation, communication system 10 can provide dynamic, optimized realizations for RAN 80 by dynamically determining decompositions of operations associated with RAN 80 into sets of VNFs for distribution among various network elements of RAN 80 based on transport network 20 characterizations and/or UE demand; determining optimal locations for instantiating the sets of VNFs; and instantiating the sets of VNFs at the optimal locations.

Communication system 10 may integrate transport level monitoring, via transport management function 22, in order to continuously and repeatedly provide characterizations of transport network 20 impairments. During operation, transport management function 22 may generate transport network 20 characterizations indicating various impairments that may be present among different locations of RF termination point(s) 18 at which VNF(s) 60 can be instantiated and different locations of other network elements associated with RAN 80 at which the set of VNF(s) 40 can be instantiated for one or more RAN controller(s) 16 and may communicate the characterizations to RAN orchestration function 30. In various embodiments, generating transport network 20 characterizations can include, but not be limited to, generating one or more table(s) indicating transport network 20 impairments for fronthaul interfaces among different locations interconnecting each of one or more RF termination point(s) 18 and other network elements associated with RAN 80 at which the set of VNF(s) 40 can be instantiated.

Thus, in various embodiments, table(s) used for characterizations can relate transport network 20 impairments with location(s) of RF termination point(s) 18 and other network elements of RAN 80 interconnected among transport network 20. In various embodiments, locations of network elements associated with RAN 80 can be identified using Global Positioning System (GPS) information, latitude and longitude information, grid or cluster information (e.g., local and/or global identifiers configured by a network operator and/or service provider) describing locations or geographic areas of macro cell networks, small cell networks, enterprise networks, etc., combinations thereof or the like. In some embodiments, location information for network elements associated with RAN 80 (e.g., RF termination point(s), data centers, servers, load balancers, etc.) can be configured for RAN orchestration function 30 and transport management function 22, which may allow these functions to easily identify locations of network elements associated with RAN 80. In still some embodiments, VNF(s) 32 and VIM 34 can be configured with location information, similar to RAN orchestration function 30, in order to identify resources for abstraction into NFVI (e.g., NFVI 50, 70) for various decompositions of VNFs.

A multitude of possible RAN decompositions (e.g., decomposition of operations associated with a given RAN into sets of VNF(s)) can be configured for RAN orchestration function 30 by a network operator and/or service provider. In some embodiments, on or more orchestration policies can be configured for RAN orchestration function 30 which can identify different possible decompositions of different sets of VNF(s) 40 that can be instantiated for one or more RAN controller(s) 16 and different sets of VNF(s) 60 that can be instantiated for one or more RF termination point(s) 18 in relation to different impairments that may be present between different locations of network elements of RAN 80. For example, during operation RAN orchestration function 30 can receive a characterization of impairments for transport network 20 generated by transport management function 22 and can compare the characterization of impairments to one or more configured orchestration policies to determine a particular decomposition of VNFs (e.g., a particular set of VNF(s) 40 and a particular set of VNF(s) 60) for RAN 80 that can be instantiated for one or more RAN controller(s) 16 and for one or more RF termination point(s) 18 in order to execute various operations associated with RAN 80.

In various embodiments, orchestration policies can be configured to include impairment criteria related to different impairments (e.g., throughput, delay (more generally, latency), jitter, loss, etc.) that can be present between different locations among transport network 20 and corresponding VNF decompositions associated with the different impairments. In various embodiments, ideal one-way latency/jitter may be sub-250 microseconds (μsec); non-ideal one-way latency/jitter may be approximately 30 milliseconds (msec); sub-ideal one-way latency/jitter may be approximately 6 msec; and near-ideal one-way latency/jitter may be approximately 1 msec.

Upon determining a particular decomposition of VNFs for RAN 80, RAN orchestration function 30 can identify one or more locations of network elements associated with RAN 80 at which to instantiate the decomposition of VNFs. In particular, RAN orchestration function can identify one or more optimal location(s) at which to instantiate the set of VNF(s) 40 for one or more RAN controller(s) 16 from multiple candidate locations of network elements associated with RAN 80. Location(s) at which to instantiate the set of VNF(s) 60 may be tied to the actual physical location(s) at which RF termination point(s) 18 are deployed within communication system 10, as may be configured by a network operator or service provider.

The example decomposition of the set of VNF(s) 40 for RAN controller(s) 16 and the set of VNF(s) 60 for RF termination point(s) 18, as shown in FIG. 1 can be referred herein to as a 'two-tiered' decomposition architecture. In various embodiments, different 'tiered' decomposition architectures can be realized for different RAN 80 virtualizations.

In some embodiments, orchestration policies can be configured for RAN orchestration function 30 to provide for additional decompositions of the set of VNF(s) 40 for RAN controller(s) 16 into one or more set of VNF(s) for one or more RAN controller portion(s) and one or more other set of VNF(s) for one or more radio aggregator portion(s). Different optimal locations can be identified at which to instantiate the set of VNF(s) for the RAN controller portion(s) and at which to instantiate the set of VNF(s) for the radio aggregator portion(s); thereby providing for a 'three-tiered' decomposition architecture for realizing a decomposition of sets of VNF(s) among the RAN controller portion(s), the radio aggregator portion(s) and the RF termination point(s) 18 to perform various operations associated with RAN 80.

In various embodiments, the set of VNF(s) for each RAN controller portion(s) in various three-tiered RAN decompositions can be associated with one or more higher level operations such as, for example, Radio Resource Control (RRC) functionality, application level functionality, protocol signaling and/or Packet Data Convergence Protocol (PDCP) functionality. In various embodiments, the set of VNF(s) for each radio aggregator portion(s) can be associated with lower link level operations such as, for example, Media Access Control (MAC) functionality and/or Radio Link Control (RLC) functionality to support traffic (e.g., user data traffic and control traffic) for one or more RF termination point(s) 18.

In some embodiments, orchestration policies can be configured for RAN orchestration function 30 in which the set of VNF(s) for the RAN controller portion(s) and the radio aggregator portion(s) can be further decomposed into a first tier set of VNF(s) for first tier radio aggregator portion(s) that may be associated with PDCP functionality, and a second tier set of VNF(s) for second tier radio aggregator portion(s) that may be associated with RLC/MAC functionality. Different optimal locations can be identified at which to instantiate the set of VNF(s) for the RAN controller portion(s), at which to instantiate the first tier set VNF(s) for the first tier radio aggregator portion(s) and at which to instantiate the second tier set VNF(s) for the second tier radio aggregator portion(s); thereby providing for a 'four-tiered' decomposition architecture for realizing a decomposition of sets of VNF(s) among the RAN controller portion(s), the first tier radio aggregator portion(s), the second tier radio aggregator portion(s) and the RF termination point(s) 18 to perform various operations associated with RAN 80.

Thus, embodiments of communication system 10 can facilitate any level of decomposition of VNFs that may be associated with any operations that can be executed for RAN 80. Regardless of whether two, three, four or any other multi-tiered decompositions are configured for various orchestration policies, RAN orchestration function 30 may provision and instantiate all virtualized RAN functionality (e.g., VNFs) at various locations interconnected throughout transport network 20, to effectively realize a distributed RAN architecture for communication system 10.

For the remainder of the discussion of FIG. 1, reference is made to the two-tiered decomposition architecture as shown in FIG. 1. However, it should be understood that the remaining discussion of FIG. 1 can equally be applied to any other multi-tiered decomposition architecture that can be realized for different RAN 80 virtualizations.

In some embodiments, orchestration policies, in addition to identifying different decomposition combinations that can be realized for different transport network 20 impairments can also be configured to include distribution criteria that can be used to identify optimal locations at which one or more instances of the set of VNF(s) 40 for one or more RAN controller(s) 16 can be distributed among network elements of RAN 80. In some embodiments, the distribution criteria can include ranges of network impairments (e.g., throughput, delay, jitter, loss, etc.) which can trigger distribution of one or more instance(s) of the set of VNF(s) 40 at one or more location(s). For example, in some cases, one given decomposition of a particular set of VNF(s) 40 may require ideal or near-ideal latency/jitter conditions, which can result in one or more first location(s) (e.g., meeting the ideal or near-ideal criteria) being identified as optimal at which to instantiate the particular set of VNF(s) 40. However, in other cases, another given decomposition of another particular set of VNF(s) 40 may allow sub-ideal latency/jitter conditions, which can result in one or more second locations (e.g., meeting the sub-ideal criteria) being identified as optimal; in still some cases, the one or more second locations could include the first locations (e.g., if characterization of the first locations indicates ideal or near-ideal conditions, then the first locations could be included in the identified optimal locations meeting the sub-ideal criteria) and other additional locations meeting the sub-ideal criteria.

In still some embodiments, orchestration policies can also be configured to include network element capability criteria, which can additionally be used (e.g., in addition to any distribution criteria that may be configured) to identify optimal location(s) at which to instantiate the set of VNF(s) 40 associated with RAN controller(s) 16. To further illustrate the concept of 'network element capability', consider an example RAN functionality breakdown with major processing capabilities spread amongst: Layer 3 (L3) cell and UE control and signaling (e.g., S1/X2 signaling, IP and/or Radio Resource Control (RRC) signaling); Layer 2 (L2) UE data packet processing (e.g., Packet Data Convergence Protocol (PDCP), Media Access Control (MAC), Radio Link Control (RLC)) and subframe real-time physical layer (PHY) control; Layer 1 (L1)/PHY signal processing and channel coding; Digital Front End (DFE) digital signal manipulation for RF optimization; and RF digital to analog (D/A) and analog to digital (A/D) signal conversion.

Different network elements associated with RAN 80 may have different or limited functional capabilities (e.g., software and/or hardware configurations) and/or may have different or limited processing capabilities (e.g., ability to perform necessary functions at a required throughput rate, within a required time frame, for a required number of users, etc.) that may be needed to support certain decompositions of sets of VNFs. Thus, in some embodiments, orchestration policies can be configured to include network element capability criteria, which can be used to identify and distribute sets of VNF(s) at one or more optimal locations of network elements associated with RAN 80. In some embodiments, capabilities of various network elements associated with RAN 80 can be configured by a network operator and/or service provider for RAN orchestration function 30, which it may use to cross-reference different network element capabilities that can be included in orchestration policies in order determine which network elements among RAN 80 at which certain VNF decompositions can be instantiated.

Not all characterizations received by RAN orchestration function 30 may result in a new decomposition of sets of VNF(s) to be realized for RAN 80. In some embodiments, transport network 20 characterizations received by RAN orchestration function 30 may trigger a redistribution of the set of VNF(s) 40 among one or more locations for certain orchestration policies that can be configured for RAN orchestration function 30. Thus, RAN orchestration function 30 may provide for the ability to dynamically update the decompositions and/or the distributions of VNFs among network elements of RAN 80 for a variety In still some embodiments, orchestration policies can be configured for RAN orchestration function 30 to consider UE demand (e.g., demand presented by UE 12*a*-12*c*) at one or more locations of network elements of RAN 80 in determining decompositions and/or distributions of sets of VNFs among network elements of RAN 80. In various embodiments, one or more network elements of RAN 80 (e.g., RF termination point(s) 18, RAN controller(s) 16 and/or RAN orchestration system 14) may monitor the demand presented by UE 12*a*-12*c* within RAN 80. In various embodiments, monitoring can include reporting UE demand to RAN orchestration function 30, which can be used to update the decomposition and/or sets of VNFs among different network elements of RAN 80.

In various embodiments, UE demand can be associated with, capacity information (e.g., sum of instantaneous bandwidth from UEs) between various locations, UE location information, UE density information (e.g., sum of number of UEs) at various locations and/or UE service type demand information (e.g., voice, data, video, IP multimedia, etc. signaling events) of various UE (e.g., UE 12*a*-12*c*) within RAN 80. In some embodiments, UE measurement reports can be used to determine UE demand. In various embodiments, UE measurement reports for a given UE (e.g., UE 12*a*) can provide signal strength information for a given RF termination point serving the UE as well as signal strength information for one or more neighboring RF termination points that may be in the vicinity of the serving RF termination point. In some embodiments, UE measurement reports from multiple UEs can be used to determine path loss information, UE throughput rate, etc., which can provide an indication of UE demand at various locations among RAN 80.

In various embodiments, knowledge of characterization(s) among various locations of network elements of RAN 80 interconnected throughout transport network 20, network element capabilities and/or UE demand among the various locations can be used by RAN orchestration function 30 to trigger different decompositions and/or redistributions of sets of VNFs according to different orchestration policies. Thus, RAN orchestration function 30 may provide for the ability to draw from a range of inputs in various embodiments in order to dynamically realize different VNF decompositions and/or distributions including, but not limited to: distributed RAN (D-RAN) decompositions; MAC-PHY decompositions for MAC-PHY, subframe fronthaul and/or Common Public Radio Interface (CPRI) fronthaul decompositions, PDCP decompositions to provide separation between D-RAN and MAC-PHY elements [which would make UE signaling and control virtualized and keep the UE data plane (up to the lower part of PDCP) distributed], split PDCP decompositions (e.g., upper PDCP and lower PDCP), PDCP/RLC decompositions, RLC/MAC decompositions, split MAC (e.g., upper MAC and lower MAC), MAC/PHY decompositions, soft bit decompositions, subframe data decompositions, subframe symbol decompositions, combinations thereof or the like as may be configured through one or more orchestration policies that can be configured for RAN orchestration function 30.

In various embodiments, different sets of VNFs can be instantiated (e.g., PHY VNFs, MAC VNFs, RLC VNFs, PDCP VNFs, combinations thereof, or any other VNFs) to execute various operations associated with RAN 80 for a multitude of decompositions and/or distributions.

In various embodiments, MAC VNFs may be further decomposed into 'upper MAC' VNFs and 'lower MAC' VNFs; PHY VNFs may be further decomposed into 'upper PHY' VNFs and 'lower PHY' VNFs; and/or PDCP VNFs may be further decomposed into 'upper PDCP' VNFs and 'lower PDCP' VNFs.

In various embodiments, upper MAC VNFs can provide one or more operations associated with, but not limited to, one or MAC scheduling functions operating at a first scheduler rate and lower MAC VNFs can provide one or more operations associated with, but not limited to, one or more MAC scheduling functions operating at a second scheduler rate, in which the second scheduler rate may be faster than the first scheduler rate in order to meet latency requirements imposed for over-the-air communications between a given RF termination point and a given UE. In some embodiments, the upper MAC VNFs can provide operations associated with block-in-time scheduling decisions (e.g., blocks of scheduling decisions) that can be communicated at a lower rate to the lower MAC VNFs, which can work through the block-in-time scheduling decisions at a faster rate. Alternatively, in some embodiments, a general MAC VNF decomposition can be provided, which may perform MAC scheduling decision operations.

In various embodiments, upper PHY VNFs can provide one or more operations associated with, but not limited to, user processing functions, which can include Forward Error Correction (FEC) and Quadrature Amplitude Modulation (QAM) and antenna mapping for hard/soft bit fronthaul operations. In various embodiments, lower PHY VNFs can provide one or more operations associated with, but not limited to, cell processing functions, which can include resource mapping functions for subframe symbol fronthaul operations, Inverse Fast Fourier Transform (IFFT) and cyclic prefix (CP) functions, and/or parallel/serial (P/S) CPRI encoding for full CPRI or compressed CPRI fronthaul operations. Alternatively, in some embodiments, a general PHY VNF decomposition can be provided, which may perform one or more of these operations.

For example, within the RAN functions, interfaces between MAC and PHY layers may operate at a 1 msec subframe rate scheduling cycle to configure and operate the lower layers. Within the PHY processing chain there are UE level channel coding and modulation operations that are provided together with cell level resource allocation and signal processing operations. For downlink (DL) subframe fronthaul operations, the lower layer interface from the PHY provides an in-phase/quadrature (I/Q) data stream representing an RF waveform in digital form between QAM and multi-antenna mapping operations (denoted as 'QAM+ multi-antenna mapping'). The I/Q data stream is carried in the CPRI interface over a high speed digital link. Thus, in various embodiments, various operations associated with PHY layer processing can be decomposed into different sets of one or more VNF(s) for handling uplink (UL) and downlink (DL) traffic flows.

In various embodiments, upper PDCP VNFs can provide one or more operations associated with, but not limited to, UE signaling and control operations and lower PDCP VNFs can provide one or more operations associated with, but not limited to, providing UE data plane operations. Alternatively, in some embodiments, a general PDCP VNF decomposition can be provided with may perform one or more of these operations.

In various embodiments, RLC VNFs can provide one or more operations associated with, but not limited to, receiving RLC service data units (SDUs) from a previous layer (e.g., a PDCP layer for downlink data) and applying addressing and/or control operations to the SDUs to output RLC packet data units (PDUs) to a subsequent layer (e.g., a MAC layer for downlink data).

In some embodiments, the dynamic, optimized realizations that can be provided by RAN orchestration function 30 may also involve moving the location of non-base station functions away from RF termination point(s) 18 to some other location interconnected among transport network 20. In various embodiments, this can include, moving from a central datacenter location to a 'super base station' location. Note a 'super base station' may provide capabilities to support functionality for multiple base stations distributed within transport network 20; the terms 'super base station' and 'base station hotel' may be used interchangeably herein in this Specification. In some embodiments, non-base station functions can include functions associated with a Self-Organizing Network (SON) management system, which can include functionality to monitor and manage RAN 80 resources among different clusters of RF termination point(s) 18 for a homogenous deployment (e.g., for a certain small cell deployment) and/or among different deployments (e.g., among different small cell, macro cell, WLAN, etc. deployments) in a heterogeneous network (HetNet).

In various embodiments, RAN orchestration system 14 can be a localized unit, a specialized unit or part of a virtualized compute platform that can operate in a data center or cloud server center or any other network element that may be associated with RAN 80. Thus, various aspects of RAN orchestration system 14 may be virtualized into a cloud-based architecture to facilitate dynamic, optimized RAN 80 realizations for communication system 10.

Thus, as described for various embodiments discussed herein, RAN orchestration function 30 may draw from a range of inputs (e.g., characterizations, UE demand, orchestration policies, etc.) to provide optimized decompositions and distributions of virtualized network functionality for RAN 80 across different locations interconnected via transport network 20. With this wider view of RAN orchestration, the RAN itself can be physically dimensioned dynamically to 'follow' end user demand in both location and service characteristics.

Additionally, in some embodiments, RAN orchestration function 30 may generate RAN feedback information to communicate to transport management function 22 regarding the decomposition and/or distribution of sets of VNFs for RAN 80. In some embodiments, transport management function 22 may include reconfiguration functionality, which may respond to certain RAN feedback information received from RAN orchestration function 30 by reconfiguring network elements of transport network 20 to accommodate different service level agreements (SLAs) (e.g., providing differentiated bandwidth and/or jitter performance). In some embodiments, transport management function 22 can include functionality to use the RAN feedback information to adjust characterizations of transport network 20 and/or may further communicate the RAN feedback information to one or more network elements within transport network 20 or in communication with transport network 20 in order to distribute or redistribute network element capabilities for transport network 20 to adjust for any updates made to RAN 80 decompositions and/or distributions.

In still some embodiments, RAN orchestration function 30 may also be configured to provide admission control capabilities. In one or more embodiments, RAN orchestration function 30 may enforce and/or command the distribution (or re-distribution) of the actual radio resources offered to any of UE 12a-12c (e.g., increasing or reducing the resources) to maintain an optimized RAN 80 decomposition and/or an optimized use of transport network 20 resources.

In various embodiments, radio resources can include, but not be limited to, number of calls, accepted radio access bearer (RAB) types, etc. For example, given a reported bandwidth characteristic, the transport resources can be used to support a first average user bandwidth 'X' for UE 12a-12c for a first decomposition 'A' or a second average user bandwidth 'Y' for UE 12a-12c for a second decomposition 'B'. If transport network 20 resources become constrained, for example, as average user bandwidth grows, this can then lead to an automatic re-distribution of RAN 80 resources. In various embodiments, distribution or re-distribution of RAN resource can include, but not be limited to, bringing online one or more new RF termination point(s) 18. Such RF termination point(s), which can be dynamically pushed offline or brought online, could be considered dormant capacity (in the physical sense), which could be enabled as a result of one or more actions and/or policies configured for RAN orchestration function 30.

By commanding the distribution (or redistribution) of resources for RAN 80 to maintain an optimized decomposition and/or optimized use of transport network 20 resources, RAN orchestration function 30 may also allow mobile network operators (MNOs) to control the investment cycle for network expansion. Consider, for example, a case in which an increase in UE traffic in the network may push the network to congestion and potentially to a mandatory expansion. Rather than being pushed to expansion, however, RAN orchestration function 30, by providing the ability to control the traffic accepted on one or more at one or more RF termination points to optimally use the available/installed resources on the transport network 20, may provide a 'tool' that MNOs can use to determine if and when to invest in network expansion.

In various embodiments, UE 12a-12c can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12a-12c may also be inclusive of a suitable interface to a human user such as a microphone, a display, a keyboard, or other terminal equipment.

UE 12a-12c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12c may have a bundled subscription for network access and application services (e.g., voice, data), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), remote authentication dial in user service (RADIUS), Stateless Address Auto-configuration, default bearer activation procedures, etc., or any suitable variation thereof. In various embodiments, UE 12a-12c can include one or transmitters and/or receivers (e.g., transceivers) and one or more antenna(s) to facilitate over-the-air communications with one or more RF termination point(s) 18 that may be deployed within RAN 80.

In various embodiments, VNF manager(s) 32 may include functionality to provide for management operations for sets of VNF(s) 40, 60. In various embodiments, such management operations can include, but not be limited to, instantiation, updating, scaling and/or termination of sets of VNF(s) 40, 60. In various embodiments, one particular VNF manager can serve each set(s) of VNF(s) 40 and another particular VNF manager can serve each set(s) of VNF(s) 60 or a given VNF manager can be serve multiple VNFs.

In various embodiments, VIM 34 may include functionality to provide for resource management operations of the compute storage network for NFVI 50 and NFVI 70. In various embodiments, resource management operations can include, but not be limited to, allocating and maintaining an inventory of software, computing, storage and/or network resources, which may be dedicated to NFVI 50 and NFVI manag 70. In some embodiments, software resources can include hypervisors, which can be implemented as virtual machines (VMs) in a suitable server or other computing platform. In some embodiments, software resources can include containers, which can be implemented within an operating system or kernel in a suitable server or other computing platform.

In some embodiments, resource management operations can further include the allocation of virtualization enablers, such as for example, allocating VMs onto hypervisors or allocating containers within operating systems or kernels, compute resources, storage and/or network elements which may provide for network connectivity. In still some embodiments, resource management operations can further include managing resources to hypervisor-based or container-based virtualizations and/or resource reclamation. In still some embodiments, resource management operations can include providing for visibility into and/or management of NFVI 50, NFVI 70, root cause analysis of performance issues/problems with NFVI 50, NFVI 70, collection of fault information and/or collection of information for capacity planning, monitoring and/or optimization of one or more dynamic RAN 80 realizations. In one or more embodiments, RAN orchestration system 14 may include multiple VIMs 34.

In various embodiments, sets of VNF(s) 40 and sets of VNF(s) 60, respectively, may be implemented as virtualized software implementations (e.g., instantiations) of various RAN functionality, which may be capable of operating via NFVI 50 and NFVI 70, respectively. In various embodiments, NFVI 50 and NFVI 70 can each include hardware and/or software resources, a virtualization layer and virtualized resources. NFVI 50 and NFVI 70 may be used to couple respective set of VNF(s) 40 and respective set of VNF(s) 60 to underlying hardware resources providing for execution of the sets of VNFs. In various embodiments, hardware resources can include, but not be limited to network, computing and/or storage resources. Connectivity to hardware resources can be provided via the virtualization layer, which can be implemented as one or more hypervisors or containers. In various embodiments, the virtualization layer may be used to abstract the hardware and/or software resources into virtualized resources (e.g., virtual network, virtual computing and/or virtual storage resources), which can be provided to ensure execution of instantiated sets of VNFs. A discussion of different potential RAN decompositions that can be realized for various two-tiered architectures is now described.

Figure 2A:
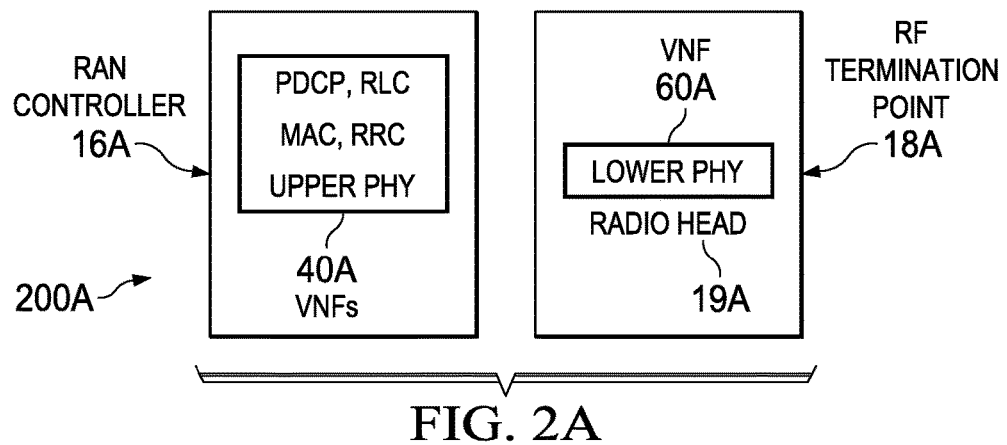
FIGS. 2A-2C are simplified block diagrams illustrating example details that can be associated with various example RAN decompositions in accordance with various potential embodiments of the communication system.
Figure 2B:
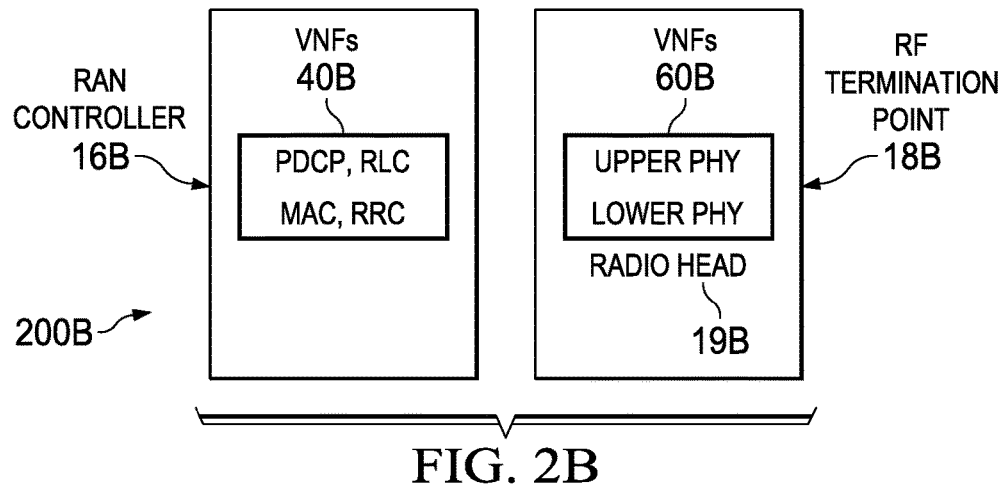
Figure 2C:
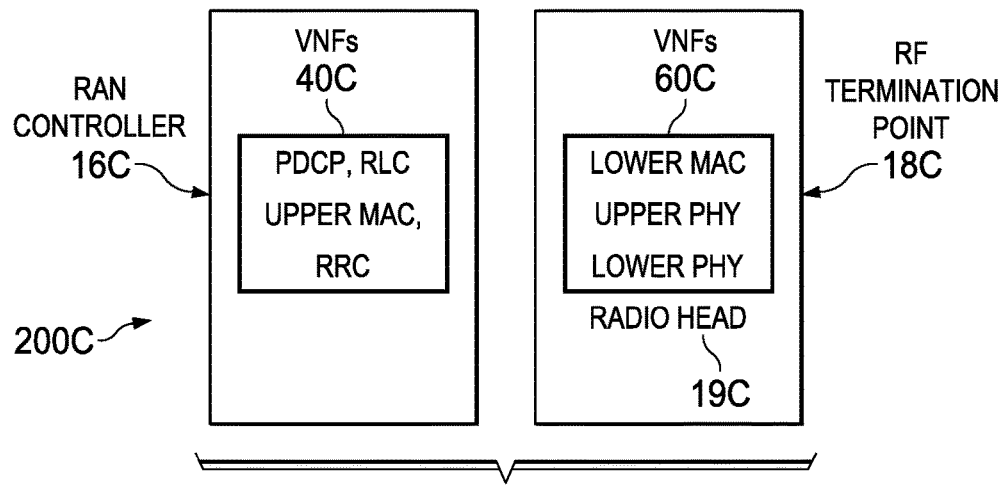

Turning to FIGS. 2A-2C, FIGS. 2A-2C are simplified block diagrams 200A-200C illustrating example details associated with various example RAN decompositions which can be realized in accordance with various potential embodiments of communication system 10. In particular, the example RAN decompositions illustrated in FIGS. 2A-2C can be associated with example two-tiered decomposition architectures, which may support different decompositions of sets of VNFs that can be instantiated between one or more RAN controller(s) and one or more RF termination point(s) interconnected via a given transport network (e.g., transport network 20). The example RAN decompositions shown in FIGS. 2A-2C are provided for illustrative purposes only to provide context to example embodiments described herein in the present disclosure and are not meant to limit the broad scope of the embodiments described herein. It should be understood that any RAN decompositions corresponding to any network element capability, transport network characterization and/or UE demand are certainly encompassed by alternative embodiments of the present disclosure as described herein and/or otherwise encompassed by any communication system that may provide for dynamic RAN orchestration.

FIG. 2A illustrates an example RAN decomposition for an example two-tiered architecture in which an example RAN controller 16A includes a set of VNFs 40A and an example RF termination point 18A includes a set of VNF 60A and a radio head 19A. Radio head 19A may be provided in RF termination point 18A to facilitate over-the-air communications with a given UE (e.g., any of UE 12a-12c). In various embodiments, the example RAN decomposition shown in FIG. 2A can be provided for transport network characterizations indicating good performance (e.g., ideal or near-ideal latency/jitter) among certain locations of transport network 20. For the example RAN decomposition shown in FIG. 2A, the set of VNFs 40A may include a PDCP VNF to provide PDCP functionality, an RLC VNF to provide RLC functionality, a MAC VNF to provide MAC functionality, an RRC VNF to provide RRC functionality and an upper PHY VNF to provide upper PHY functionality for RAN controller 16A and VNF 60A may include a lower PHY VNF to provide lower PHY functionality for RF termination point 18A.

FIG. 2B illustrates another example RAN decomposition for another two-tiered architecture in which an example RAN controller 16B includes a set of VNFs 40B and an example RF termination point 18B includes a set of VNFs 60B and a radio head 19B. Radio head 19B may be provided in RF termination point 18B to facilitate over-the-air communications with a given UE (e.g., any of UE 12a-12c). In various embodiments, the example RAN decomposition shown in FIG. 2B can be provided for transport network characterizations indicating mediocre performance (e.g., less than near-ideal, sub-ideal or variations thereof latency/jitter) among certain locations of transport network 20. For the example RAN decomposition shown in FIG. 2B, the set of VNFs 40B may include a PDCP VNF to provide PDCP functionality, an RLC VNF to provide RLC functionality, a MAC VNF to provide MAC functionality and an RRC VNF to provide RRC functionality for RAN controller 16B and the set of VNFs 60B may include an upper PHY VNF to provide upper PHY functionality and a lower PHY VNF to provide lower PHY functionality for RF termination point 18B.

FIG. 2C illustrates yet another example RAN decomposition for another two-tiered architecture in which an example RAN controller 16C includes a set of VNFs 40C and an example RF termination point 18C includes a set of VNFs 60C and a radio head 19C. Radio head 19C may be provided in RF termination point 18C to facilitate over-the-air communications with a given UE (e.g., any of UE 12a-12c). In various embodiments, the example RAN decomposition shown in FIG. 2C can be provided for transport network characterizations indicating poor performance (e.g., non-ideal or variations thereof latency/jitter) among certain locations of transport network 20. For the example RAN decomposition shown in FIG. 2C, the set of VNFs 40C may include a PDCP VNF to provide PDCP functionality, an RLC VNF to provide RLC functionality, an upper MAC VNF to provide upper MAC functionality and an RRC VNF to provide RRC functionality for RAN controller 16C and the set of VNFs 60C may include a lower MAC VNF to provide lower MAC functionality, an upper PHY VNF to provide upper PHY functionality and a lower PHY VNF to provide lower PHY functionality for RF termination point 18C.

Figure 3:
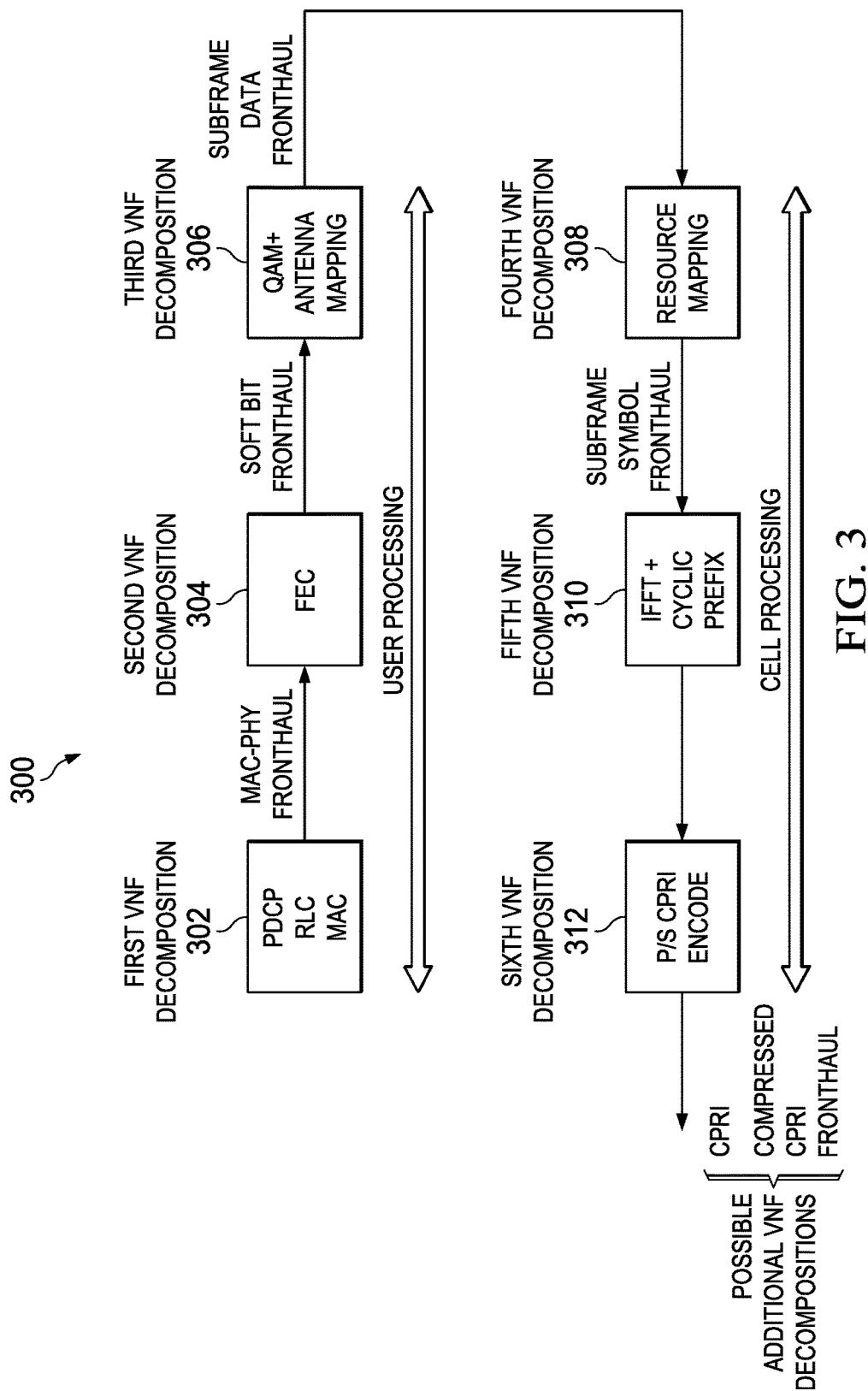
FIG. 3 is a simplified block diagram illustrating other example details that can be associated with another example RAN decomposition in accordance with one potential embodiment of the communication system.

Turning to FIG. 3, FIG. 3 is a simplified block diagram 300 illustrating yet other example details associated with other example RAN decompositions that can be realized in accordance with one potential embodiment of communication system 10. In various embodiments, the example RAN decompositions shown in FIG. 3 can be associated with a multi-tiered RAN decomposition for different sets of VNFs, which can be distributed among various network elements associated with RAN 80 for downlink (DL) UE traffic flows.

FIG. 3 illustrates a first VNF decomposition 302 including a set of PDCP, RLC and MAC VNFs, which can support MAC-PHY fronthaul operations; a second VNF decomposition 304 including a set of FEC VNF, which can support soft bit fronthaul operations; a third VNF decomposition 306 including a set of QAM and multi-antenna mapping VNFs (denoted as 'QAM+antenna mapping'), which can support subframe data fronthaul operations; a fourth VNF decomposition 308 including a set of resource mapping VNF, which may support subframe symbol fronthaul operations; a fifth VNF decomposition 310 including a set of IFFT and cyclic prefix VNFs; and a sixth VNF decomposition 312 including a set of P/S CPRI encoding VNF, which may support either full CPRI fronthaul or compressed CPRI fronthaul operations, which can be provided via possible additional VNF decompositions.

In various embodiments sets of VNFs associated with PDCP, RLC, MAC, FEC, QAM and antenna mapping functionalities may be associated with user processing (e.g., RAN controller) capabilities. In various embodiments, sets of VNFs associated with resource mapping, IFFT, cyclic prefix and P/S CPRI encoding functionalities may be associated with cell (e.g., RF termination point) processing capabilities.

Figure 4:
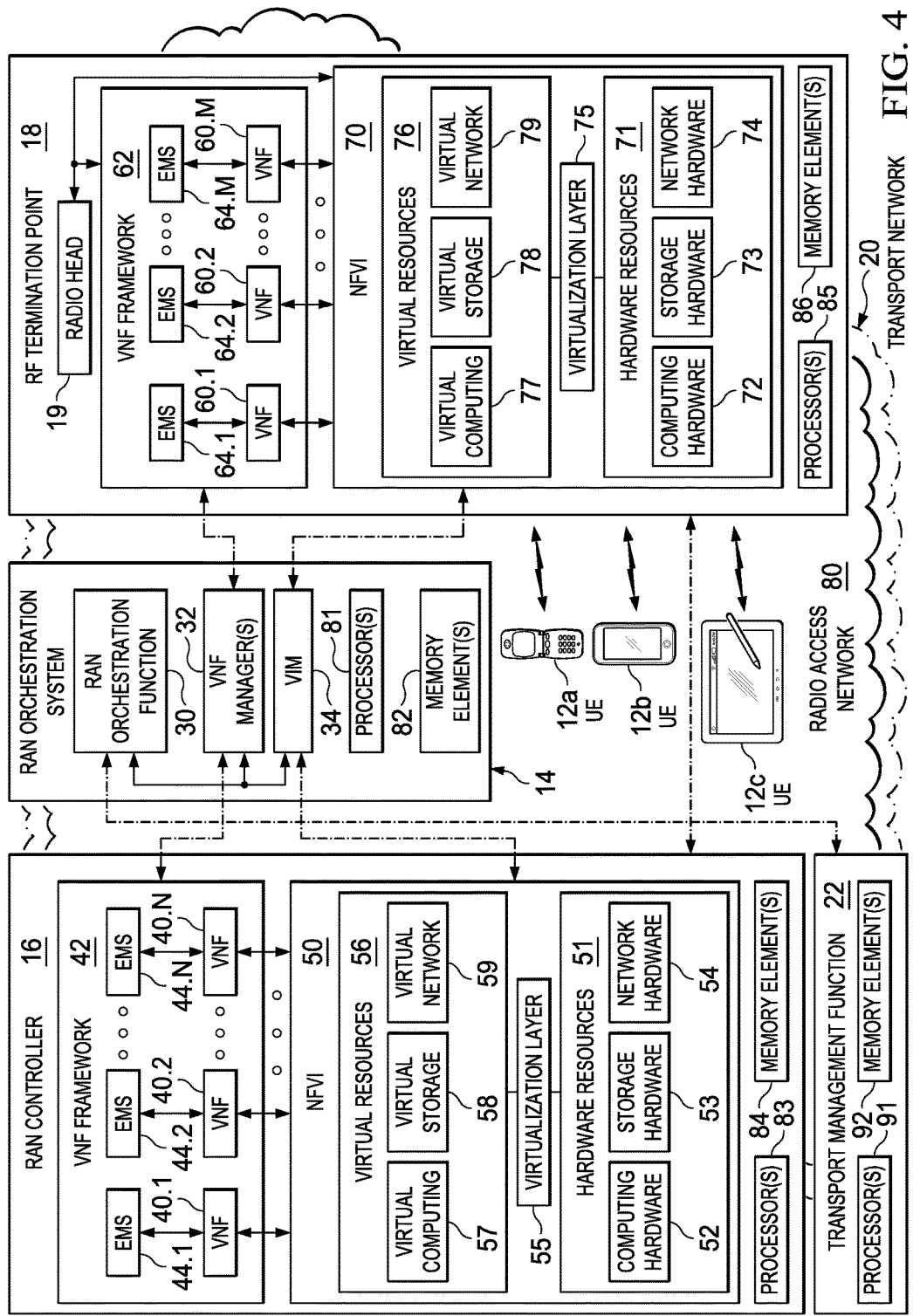
FIG. 4 is simplified block diagram illustrating example details that can be associated with one potential embodiment of the communication system.

Turning to FIG. 4, FIG. 4 is a simplified block diagram illustrating example details associated with one potential embodiment of communication system 10. In particular, FIG. 4 illustrates various elements, frameworks, resources, etc. that can be present within a virtualized RAN architecture. The example details discussed for FIG. 4 are discussed with reference to a two-tiered decomposition architecture, however, it should be understood that the example details discussed for FIG. 4 can be extended to encompass any multi-tiered RAN decomposition architectures as discussed herein.

FIG. 4 includes RAN 80, RAN orchestration system 14, a given RAN controller 16, a given RF termination point 18, and transport network 20, which may interface with transport management function 22. Also shown in FIG. 4 are UE 12a-12c within RAN 80. RAN orchestration system 14 includes RAN orchestration function 30, VNF manager(s) 32, VIM 34, one or more processor(s) 81 and one or more memory element(s) 82. In various embodiments, one or more processor(s) 81 can be hardware processor(s). Transport management function 22 may include one or more processor(s) 91 and one or more memory element(s) 92. In various embodiments, one or more processor(s) 91 can be hardware processor(s).

RAN controller 16 can include a VNF framework 42 for a set of one or more VNF 40.1-40.N instantiations and can include NFVI 50. As shown in FIG. 4, each VNF 40.1-40.N instantiation, respectively, can interface with a respective element management system (EMS) 44.1-44.N, which may perform various management functions for each corresponding VNF 40.1-40.N instantiations as directed by VNF manager(s) 32. In some embodiments, each VNF 40.1-40.N instantiation can include a corresponding set of one or more VNF component(s) (VNFC(s)) (not shown). NFVI 50 may provide interconnectivity and infrastructure for interfacing each VNF 40.1-40.N instantiation with virtual resources 56, which may be abstracted from hardware resources 51 via a virtualization layer 55. In various embodiments, virtual resources 56 can include virtual computing 57, virtual storage 58 and virtual network 59 resources. In various embodiments, hardware resources 51 may include computing hardware 52, storage hardware 53 and network hardware 54. Virtualization layer 55 can be used to abstract hardware resources 51 into virtual resources 56 to provide NFVI 50 for the VNF framework 42 for one or more VNF(s) 40.1-40.N and EMS 44.1-44.N, respectively. RAN controller 16 may also include one or more processor(s) 83 and one or more memory element(s) 84. In various embodiments, one or more processors(s) 83 may be hardware processor(s).

RF termination point 18 can include a VNF framework 62 for a set of one or more VNF 60.1-60.M instantiations and NFVI 70. As shown in FIG. 4, each VNF 60.1-60.M instantiation, respectively each of which can interface with a respective EMS 64.1-64.M, which may perform various management functions for each corresponding VNF 60.1-60.M instantiation as directed by VNF manager(s) 32. In some embodiments, each VNF 60.1-60.M instantiation can include a corresponding set of one or more VNF component(s) (VNFC(s)) (not shown). NFVI 70 may provide interconnectivity and infrastructure for interfacing each VNF 60.1-60.M instantiation with virtual resources 76, which may be abstracted from hardware resources 71 via a virtualization layer 75. In various embodiments, virtual resources 76 can include which may include virtual computing 77, virtual storage 78 and virtual network 79 resources. In various embodiments, hardware resources 71 may include computing hardware 72, storage hardware 73 and network hardware 74. Virtualization layer 75 can be used to abstract hardware resources 71 into virtual resources 76 to provide NFVI 70 for the VNF framework 62 for one or more VNF(s) 60.1-60.M and EMS 64.1-64.M, respectively. RF termination point 18 may also include one or more processor(s) 85 and one or more memory element(s) 86 and includes radio head 19. In various embodiments, one or more processor(s) 85 may be hardware processors.

Figure 5A:
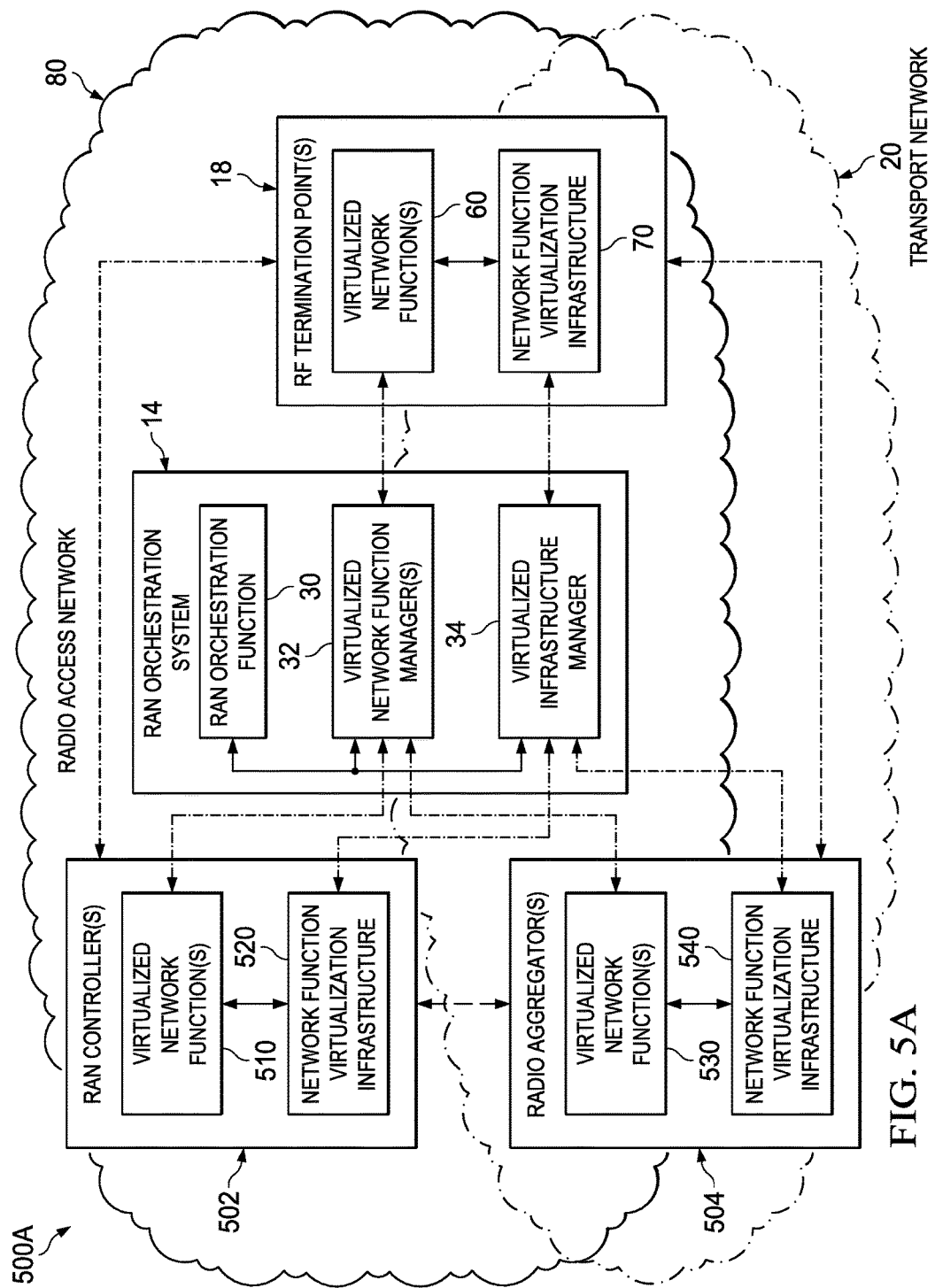
FIGS. 5A-5B are simplified block diagrams illustrating example details associated example RAN decompositions that can be associated with various potential embodiments of the communication system.
Figure 5B:
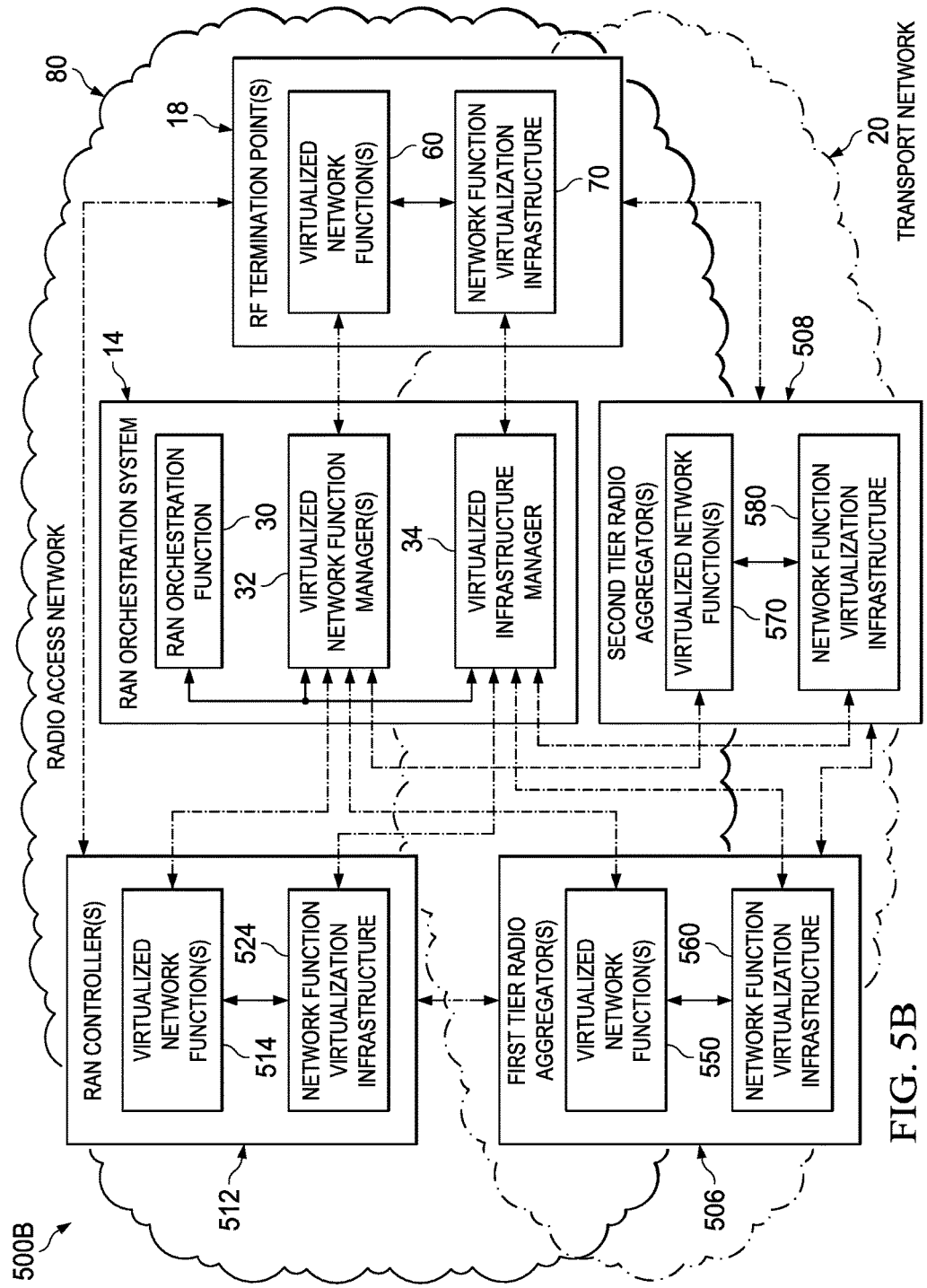

Turning to FIGS. 5A-5B, FIGS. 5A-5B are simplified block diagrams 500A-500B illustrating example details associated with example multi-tiered RAN decomposition architectures that can be associated with various potential embodiments of communication system 10.

Referring to FIG. 5A, FIG. 5A is a simplified block diagram 500A illustrating an example three-tiered RAN decomposition that can be associated with one potential embodiment of communication system 10 in which VNFs for RAN 80 can be further decomposed into sets of VNFs for one or more RAN controller(s) 502, one or more radio aggregator(s) 504 and one or more RF termination point(s) 18. Each of RAN controller(s) 502, radio aggregator(s) 504 and RF termination point(s) 18 can interface with RAN orchestration system 14, which can include RAN orchestration function 30, VNF manager(s) 32 and VIM 34. RAN controller(s) 502 can include a set of one or more VNF(s) 510, which may interface with VNF manager(s) 32 and a NFVI 520, which may further interface with VIM 34 of RAN orchestration system 14 via transport network 20. Radio aggregator(s) 504 can include a set of one or more VNF(s) 530, which may interface with VNF manager(s) 32 and a NFVI 540, which may further interface with VIM 34 of RAN orchestration system 14 via transport network 20. RF termination point(s) 18 including a set of VNF(s) 60 and NFVI 70 can also interface with RAN orchestration system 14 in a manner as described herein. RAN orchestration function 30 can also interface with transport management function 22, as shown in FIG. 1, though this is not illustrated in FIG. 5A in order to illustrate other features of the example three-tiered RAN decomposition.

Essentially, the example three-tiered RAN decomposition shown in FIG. 5A can provide for a further decomposition of the set of VNF(s) 40 for RAN controller(s) 16, as shown in FIG. 1, into the set of VNF(s) 510 for RAN controller(s) 502 and the set of VNF(s) 530 for radio aggregator(s) 504. In various embodiments, the set of VNF(s) 510 for RAN controller(s) 502 can be associated with one or more higher level operations such as, for example, RRC functionality, application level functionality, S1/X2 signaling and/or protocol signaling and can also be associated with PDCP functionality. In various embodiments, the set of VNF(s) 530 for radio aggregator(s) 504 can be associated with lower link level operations such as, for example, MAC functionality and RLC functionality to support traffic (e.g., user data traffic and control traffic) for one or more RF termination point(s) 18.

In various embodiments, optimal locations among network transport 20 can be identified at which to instantiate the sets of VNF(s) 510 and 530. In various embodiments, the optimal locations can be the same or different depending on impairments among certain locations of the transport network 20, network equipment capabilities, policies, etc. For example, in some cases, an optimal location for instantiating the set of VNF(s) 530 for a given radio aggregator 504 may be near a given RF termination point 18 or sub-cluster of RF termination points 18 whose traffic it is supporting, while an optimal location for instantiating the set of VNF(s) 510 for a given RAN controller 502 may be based on a larger collection of RF termination points 18 or multiple clusters of RF termination points 18 and corresponding radio aggregators 504 serving traffic for the RF termination points (e.g., located in an approximate center of a cluster of RF termination points). In other cases, for example, different network elements at a same approximate location (e.g., there can be multiple network elements present at a same approximate location) can be identified at which to instantiate the sets of VNF(s) 510 and VNF(s) 530 and their corresponding NFVI.

Referring to FIG. 5B, FIG. 5B is a simplified block diagram 500B illustrating an example four-tiered RAN decomposition that can be associated with one potential embodiment of communication system 10 in which VNFs for RAN 80 can be further decomposed into sets of VNFs for one or more RAN controller(s) 512, one or more first tier radio aggregator(s) 506, one or more second tier radio aggregator(s) 508 and one or more RF termination point(s) 18. RAN controller(s) 512 can include a set of one or more VNF(s) 514, which may interface with VNF manager(s) 32 and a NFVI 524, which may further interface with VIM 34 of RAN orchestration system 14 via transport network 20. First tier radio aggregator(s) 506 can include a first tier set of one or more VNF(s) 550, which may interface with VNF manager(s) 32 and a NFVI 560, which may further interface with VIM 34 of RAN orchestration system 14 via transport network 20. Second tier radio aggregator(s) 508 can include a second tier set of one or more VNF(s) 570, which may interface with VNF manager(s) 32 and a NFVI 580, which may further interface with VIM 34 of RAN orchestration system 14 via transport network 20.

In various embodiments, the set of VNF(s) 514 for RAN controller(s) 512 can be associated with one or more higher level operations such as, for example, RRC functionality, application level functionality, S1/X2 signaling and/or protocol signaling. In various embodiments, the first tier set of VNF(s) 550 for first tier radio aggregator(s) 506 can be associated with PDCP functionality and the second tier set of VNF(s) 570 for second tier radio aggregator(s) 508 can be associated with RLC/MAC functionality. Optimal locations among network transport 20 can be identified at which to instantiate sets of VNF(s) 514, 550 and 570, and their corresponding NFVI which can be the same or different for various decompositions, depending on, for example, impairments among certain locations of the transport network 20, network equipment capabilities, policies, etc.

Thus, in various embodiments, operations for determining an optimized realization for RAN 80 can include, among others: gathering information (e.g., transport network 20 characterizations and/or UE demand information) between various locations of network elements of RAN 80 interconnected among transport network 20; determining a decomposition of operations associated with RAN 80 into particular sets of VNF(s) that can be distributed among one or more locations of network elements of RAN 80 (e.g., RF termination point (18), candidate locations of data centers, servers, etc.) based on one or more orchestration policies and the gathered information; identifying optimal locations at which to instantiate the particular sets of VNF(s) based on one or more orchestration policies and the gathered information (e.g., for particular sets of VNF(s) other than those that are to be instantiated at RF termination point(s) 18); and instantiating the sets VNF(s).

Figure 6A:
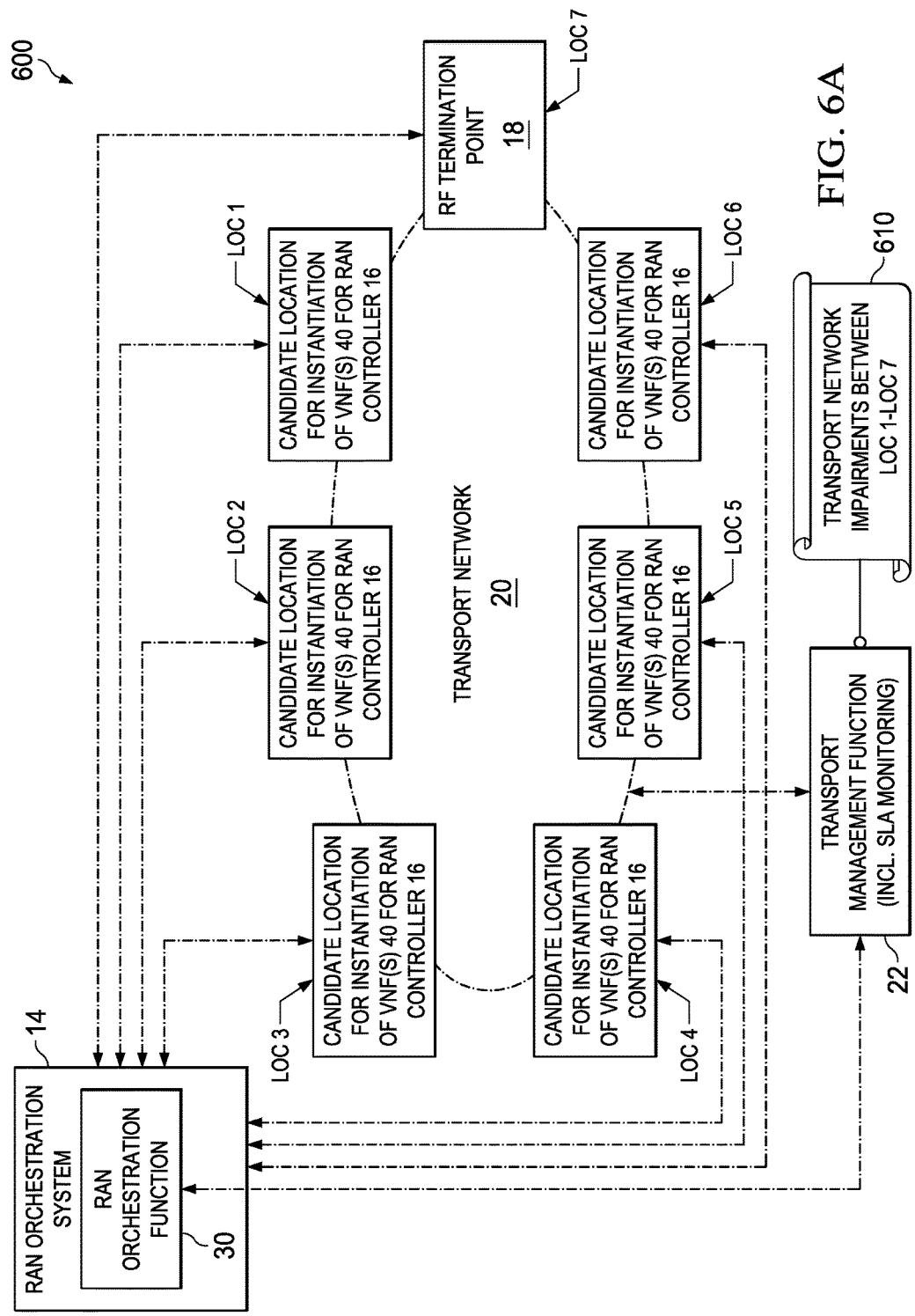
FIG. 6A is a simplified block diagram illustrating other example details that can be associated with one potential embodiment of the communication system.

Turning to FIG. 6A, FIG. 6A is a simplified block diagram 600 illustrating example details that can be associated with one potential embodiment of communication system 10. In particular, FIG. 6A illustrates various candidate locations (LOC 1-LOC 6) at which a particular set of VNF(s) 40 for one or more RAN controller(s) 16 for a particular RAN decomposition can be instantiated among transport network 20 and another location (LOC 7) at which a given RF termination point 18 is deployed. FIG. 6A includes RAN orchestration system 14 including RAN orchestration function 30 and transport network 20, which may interface with transport management function 22. Candidate locations LOC 1-6 can be associated with network elements of RAN 80 interconnected among transport network such as, for example, other RF termination points, data centers, servers, controllers or any other infrastructure that may be provided for RAN 80. RAN 80 is not shown in FIG. 6A in order to illustrate other features of communication system 10. For FIG. 6A, candidate locations LOC 1-6 of network elements and LOC 7 for RF termination point 18, each situated on the perimeter of the dash-dot lined circle representing transport network 20, as well as RAN orchestration system 14 and transport management function 22 are assumed to be interconnected via transport network 20.

During operation, transport management function 22, through one or more transport network 20 characterizations, may generate one or more table(s) 610 indicating transport network 20 impairments between each location LOC 1-7. Transport network 20 impairments indicated in table(s) 610 (and any other information such as UE demand, etc. that may be gathered by RAN orchestration function) can be used by RAN orchestration function 30 to determine an optimized decomposition of functionality for RAN 80 into the particular set of VNF(s) 40 for one or more RAN controller(s) 16 and a particular set of VNF(s) 60 for RF termination point 18 and to identify optimal location(s) at which to instantiate (e.g., distribute) one or more of the set of VNF(s) 40 for one or more RAN controller(s) 16 from candidate locations LOC 1-6 based on one or more orchestration policies that may be configured for RAN orchestration function 30.

In one example case, optimal location(s) could be identified based on location(s) of network elements nearest to RF termination point 18. For example, in FIG. 6A, either network elements at candidate locations LOC 1 or LOC 6 could be identified as optimal location(s) at which to instantiate a set of VNF(s) 40 for a RAN controller 16 as they may be nearest to LOC 7 of RF termination point 18. In another example case, optimal location(s) could be identified based on latency/jitter between network elements at candidate locations LOC 1-6 and RF termination point 18. For example, LOC 4 might be determined to have the lowest latency/jitter for transport network interconnections with RF termination point 18, in which case a set of VNF(s) 40 for a RAN controller 16 could be instantiated among network elements located at candidate location LOC 4. It should be understood that one or more optimal location(s) for instantiation of one or more set(s) of VNF(s) 40 for RAN controller(s) 16 can be identified based on any criteria, location information, characterization information, UE demand, etc. for one or more orchestration policies that may be configured for RAN orchestration function 30.

Turning to FIG. 6B, FIG. 6B illustrates example details that may be associated with FIG. 6A in accordance with one embodiment of communication system 10. FIG. 6B illustrates an example table 610.1 including a table of impairments 612 that can be generated for a characterization of impairments that may be present between each location LOC 1-7. For example table 610.1, a bidirectional symmetry is assumed for impairments between each location (e.g., impairments for traffic flowing from LOC 1 toward LOC 2 [$I_{1,2}$] is the same as impairments for traffic flowing from LOC 2 towards LOC 1 [$I_{2,1}$] such that $I_{1,2}=I_{2,1}$), which can reduce the number of characterizations generated for example table 610.1 as are illustrated by the '*' indications. Note also no characterizations may be made between a particular location and itself, also illustrated by the '*' indications. However, the assumption could be removed in which case example table 610.1 could be generated to include different characterizations for different directions of traffic (e.g., uplink versus downlink) flowing between LOC 1-7.

Transport management function 22 may, in some embodiments, monitor impairments for transport network 20 in relation to SLAs configured for interconnected locations of network elements associated with RAN 80 without needing knowledge of what types of network elements (e.g., RF termination points, data centers, etc.) may be associated with each interconnected location. Transport management function may be configured with one or more SLAs in order to measure and monitor certain impairments between various locations.

In some embodiments, each impairment 612 can be generated as an indexed list of impairments, as illustrated by example impairment $I_{N,M}$. Example impairment $I_{N,M}$ includes a set of indexed impairments 614 (e.g., {$I.1_{N,M}$, I.$2_{N,M}$, I.$3_{N,M}$, ..., I.$X_{N,M}$}). Each indexed impairment 614 may be associated with a particular impairment (e.g., throughput, delay, jitter, loss, etc.) for any number of impairments that a network operator and/or service provider desires to characterize. In other embodiments, rather than include an indexed list of impairments between each location, particular tables can be generated to describe particular impairments (e.g., a throughput table, a latency/jitter table, a loss table, etc.). Thus, any number of tables can be generated to describe impairments among locations of a given transport network in accordance with various embodiments as described herein.

Figure 7:
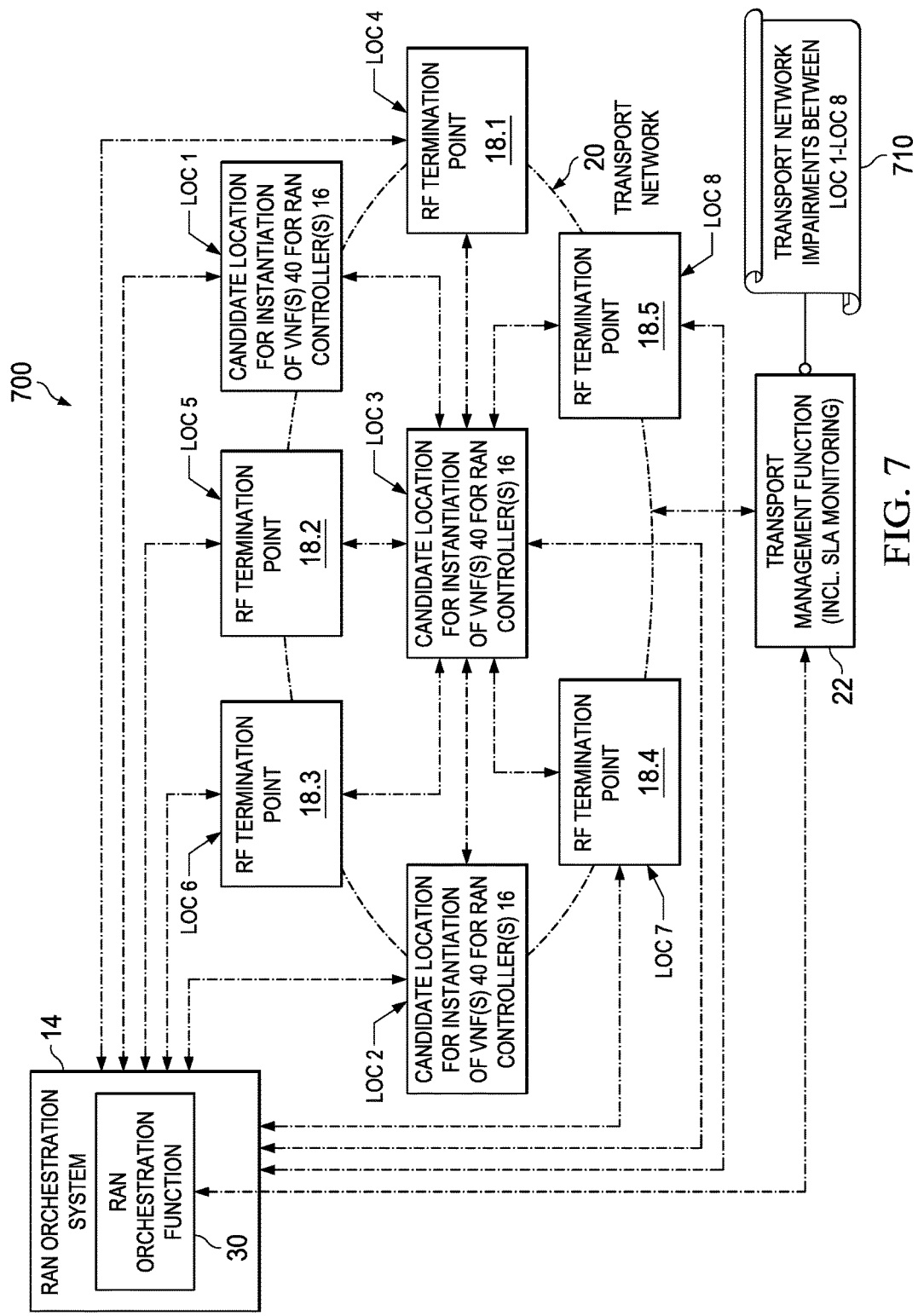
FIGS. 7-9 are simplified block diagrams illustrating other example details that can be associated with various potential embodiments of the communication system.

Turning to FIG. 7, FIG. 7 is a simplified block diagram 700 illustrating example details that can be associated with one potential embodiment of communication system 10. In particular, FIG. 7 provides example details associated with scaling RAN decompositions among multiple candidate locations (LOC 1-LOC 3) at which a particular set of VNF(s) 40 can be instantiated for one or more RAN controller(s) 16 for a particular RAN decomposition and locations (LOC 4-8) at which each of an RF termination point 18.1-18.5, respectively, is deployed.

FIG. 7 includes RAN orchestration system 14 including RAN orchestration function 30 and transport network 20, which may interface with transport management function 22. Candidate locations LOC 1-3 can be associated with any network elements of RAN 80 interconnected among transport network 20 such as, for example, other RF termination points, data centers, servers, controllers, or any other infrastructure that may be provided for RAN 80. RAN 80 is not shown in FIG. 7 in order to illustrate other features of communication system 10. For FIG. 7, candidate locations LOC 1-2 and LOC 4-8 for RF termination points 18.1-18.5, respectively, each situated on the perimeter of the dash-dot lined circle representing transport network 20, and candidate location LOC 3 within the dash-dot circle representing transport network 20, as well as RAN orchestration system 14 and transport management function 22 are all assumed to be interconnected via transport network 20.

During operation, transport management function 22, through one or more transport network 20 characterizations, may generate one or more table(s) 710 indicating transport network 20 impairments between each location LOC 1-8.

In various embodiments, transport network impairments indicated table(s) 710 (and any other information such as UE demand, etc. that may be gathered by RAN orchestration function) can be used by RAN orchestration function 30 to determine an optimized decomposition of network functionality for RAN 80 into the particular set of VNF(s) 40 for one or more RAN controller(s) 16 and a particular set of VNF(s) 60 for each RF termination point 18.1-18.5 and to identify optimal location(s) at which to instantiate one or more of the particular set(s) of VNF(s) 40 for one or more RAN controller(s) 16 from candidate locations LOC 1-3 based on one or more orchestration policies that may be configured for RAN orchestration function 30.

Consider one example case in which a characterization of transport network 20 impairments indicates ideal or near-ideal latency/jitter for candidate location LOC 3. As candidate location LOC 3 may be at an approximate geographic center among LOC 4-8 for RF termination points 18.1-18.5 and may have ideal or near-ideal latency/jitter between each RF termination point 18.1-18.5, LOC 3 might be identified as an optimal location for instantiating one particular set of VNF(s) 40 for one RAN controller 16 to manage RF termination points 18.1-18.5.

However, consider another example case in which characterization of transport network 20 impairments included in table(s) 710 indicates non-ideal performance for candidate location LOC 3 and ideal, near-ideal or sub-ideal (or some variation thereof better than non-ideal performance) for candidate locations LOC 1 and LOC 2. In one optimized RAN 80 realization, for example, RAN orchestration function 30 may identify candidate location LOC 2 as an optimal location at which to instantiate a first instance of the particular set of VNF(s) 40 for a first RAN controller 16 to manage RF termination points 18.3 and 18.4 (e.g., based on candidate location LOC 2 being located in a geographical proximity nearest to RF termination points 18.3 and 18.4 and having better than non-ideal latency/jitter between the RF termination points). RAN orchestration function 30 may further, for example, identify candidate location LOC 1 as an optimal location at which to instantiate a second instance of the particular set of VNF(s) 40 for a second RAN controller 16 to manage RF termination points 18.1, 18.2 and 18.5 (e.g., based on candidate location LOC 2 being located in a geographical proximity nearest to RF termination points 18.1, 18.2 and 18.5 and having better than non-ideal latency jitter between the RF termination points). Thus, multiple instantiations of particular sets of VNF(s) 40 for multiple RAN controllers 16 can be distributed throughout RAN 80.

However, consider yet another example case in which network element capabilities for network elements located at candidate locations LOC 3 and LOC 2 indicates that network elements at these candidate locations are incapable of supporting various RAN controller 16 functionality for the particular set of VNF(s) 40. Thus, in one optimized RAN 80 realization, RAN orchestration function 30 may identify candidate location LOC 1 as an optimal location at which to instantiate the particular set of VNF(s) 40 for RAN controller 16 to manage all of RF termination points 18.1-185.

Consider yet another example in which UE demand at RF termination point 18.4 is substantially higher than UE demand for any other RF termination point. Thus, in one optimized RAN 80 realization, RAN orchestration function may identify candidate location LOC 2 as an optimal location at which to instantiate the particular set of VNF(s) 40 for RAN controller 16.

Accordingly, as illustrated in the above example cases any distribution of any particular set of VNF(s) 40 for any number of RAN controller(s) 16 can be realized for any decomposition of RAN 80 for various characterizations, network element capabilities, UE demand, combinations thereof or the like as discussed for various embodiments described herein. As discussed herein, communication system 10 may also facilitate different decompositions of VNFs for RAN 80, which can be realized through two-tiered or three-tiered decomposition architectures for different network characterizations, network element capabilities, UE demand, etc. In various embodiments, distributions of particular sets of VNFs for three-tiered RAN decompositions can also vary depending on network characterizations, network element capabilities, UE demand, etc. for one or more orchestration policies that may be configured for RAN orchestration function 30, as discussed below for FIGS. 8-9.

Figure 8:
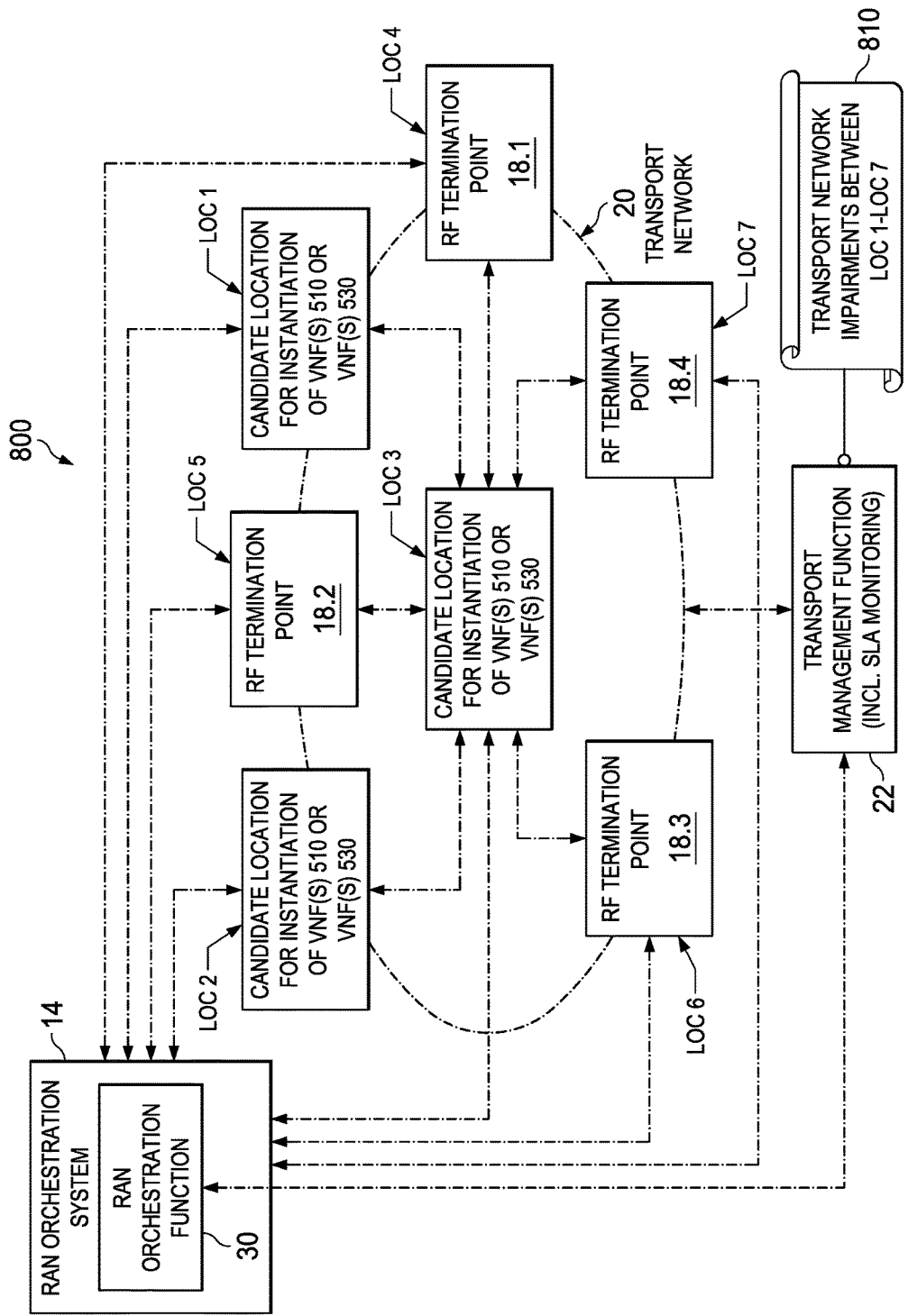

Turning to FIG. 8, FIG. 8 is a simplified block diagram 800 illustrating example details that can be associated with one potential embodiment of communication system 10. In particular, FIG. 8 illustrates various candidate locations LOC 1-3 at which a particular set of VNF(s) 510 can be instantiated for one or more RAN controller(s) 502 and/or at which a particular set of VNF(s) 530 can be instantiated for one or more radio aggregator(s) 504 among network elements of RAN 80 interconnected by transport network 20 for a particular RAN 80 decomposition. RAN 80 is not shown in FIG. 8 in order to illustrate other features of communication system 10.

FIG. 8 includes RAN orchestration system 14 including RAN orchestration function 30 and transport network 20, which may interface with transport management function 22, and locations LOC 4-7 at which each of a number of RF termination point 18.1-18.4, respectively, is deployed. Candidate locations LOC 1-3 can be associated with any network elements of RAN 80 interconnected among transport network 20 such as, for example, other RF termination points, data centers, controllers, or any other infrastructure provided for RAN 80. For FIG. 8, candidate locations LOC 1-2 and LOC 4-7 for RF termination points 18.1-18.4, respectively, each situated on the perimeter of the dash-dot lined circle representing transport network 20, candidate location LOC 3 within the dash-dot circle represent transport network 20, as well as RAN orchestration system 14 and transport management function 22 are assumed to be interconnected via transport network 20.

During operation, transport management function 22, through one or more transport network 20 characterizations, may generate one or more table(s) 810 indicating transport network impairments between each location LOC 1-7 interconnected among transport network 20.

Transport network impairments indicated in table(s) 810 (and any other information such as UE demand, etc. that may be gathered by RAN orchestration function 30) can be used by RAN orchestration function 30 to determine an optimized decomposition of network functionality for RAN 80 into a particular set of VNF(s) 510 for one or more RAN controller(s) 502, a particular set of VNF(s) 530 for one or more radio aggregator(s) 504 and a particular set of VNF(s) 60 for each RF termination point 18.1-18.4 and to identify optimal location(s) at which to instantiate one or more of the particular set of VNF(s) 510 for one or more RAN controller(s) 502 and one or more of the particular set of VNF(s) 530 for one or more radio aggregator(s) 504 from candidate locations LOC 1-3 based on one or more orchestration policies that may be configured for RAN orchestration function 30.

Consider one example case in which, based on a given characterization of transport network 20 impairments included in table(s) 810 and/or UE demand, RAN orchestration function 30 identifies candidate location LOC 3 as an optimal location at which to instantiate the particular set of VNF(s) 510 for one RAN controller 502 to perform higher level (e.g., RRC, protocol signaling, etc.) operations for RF termination points 18.1-18.4; identifies candidate location LOC 2 as an optimal location at which to instantiate a first instance of the particular set of VNF(s) 530 for a first radio aggregator 504 to perform lower level (e.g., PDCP, RLC, MAC) operations for RF termination points 18.2 and 18.3; and identifies candidate location LOC 1 as an optimal location at which to instantiate a second instance of the particular set of VNF(s) 530 for a second radio aggregator 504 to perform lower level operations for RF termination points 18.1 and 18.4.

Accordingly, for one or more embodiments as discussed herein, one or more optimal location(s) for instantiation of a particular set of VNF(s) 510 for one or more RAN controller(s) 502 and/or for instantiation of a particular set of VNF(s) 530 for one or more radio aggregator(s) 504 can be identified based on any criteria (e.g., network element capabilities), characterization information, UE demand, etc. for one or more orchestration policies that may be configured for RAN orchestration function 30.

Figure 9:
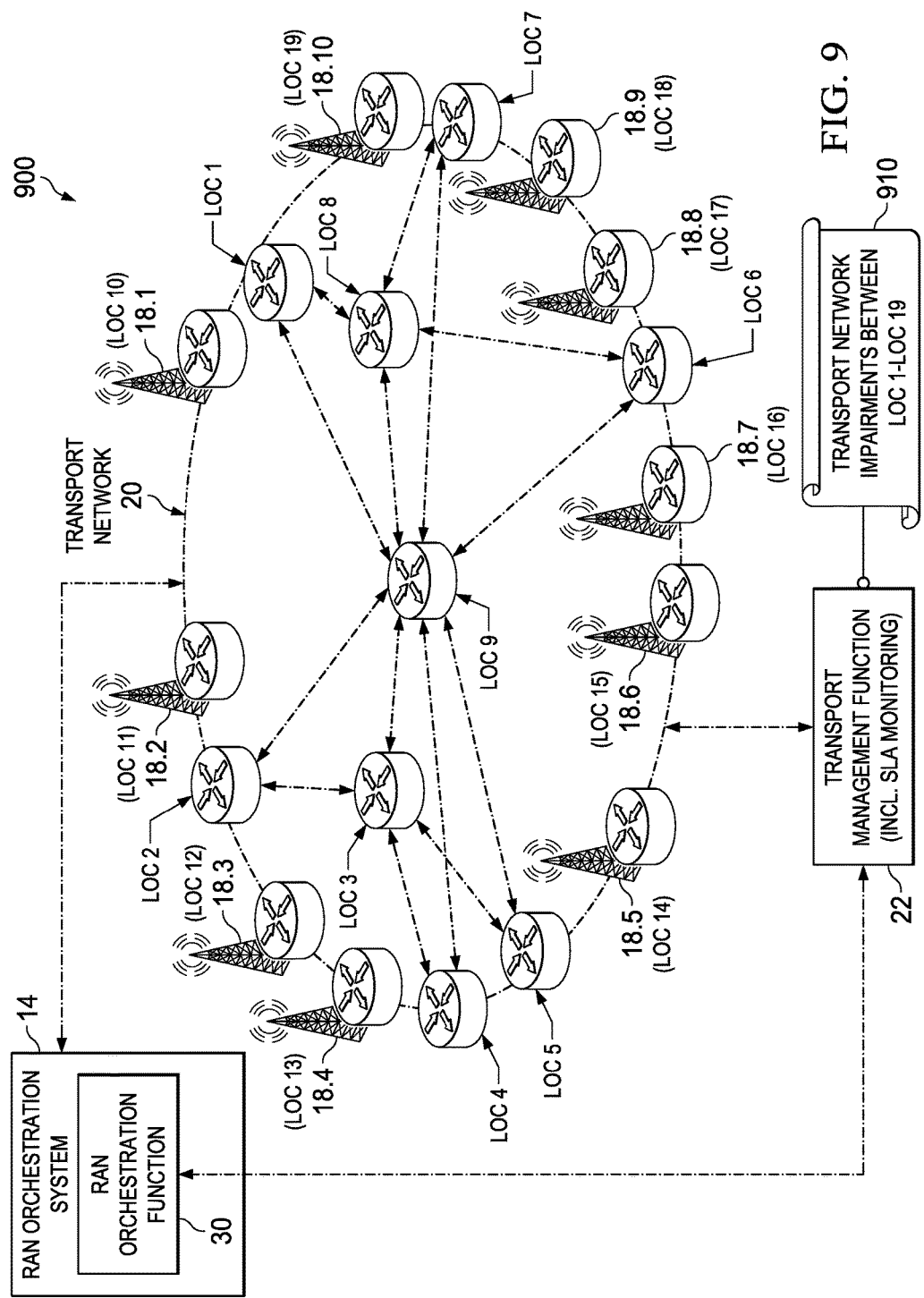

Turning to FIG. 9, FIG. 9 is a simplified block diagram 900 illustrating example details that can be associated with one potential embodiment of communication system 10. In particular, FIG. 9 illustrates various candidate locations LOC 1-9 at which a particular set of VNF(s) 514 for one or more RAN controller(s) 512; at which a particular first tier set of VNF(s) 550 for one or more first tier radio aggregator(s) 506; and/or at which a particular second tier set of VNF(s) 570 for one or more second tier radio aggregator(s) 508 can be instantiated among transport network 20 for a particular RAN decomposition. Candidate locations LOC 1-9 are represented in FIG. 9 as generic network elements in order to illustrate various complexities that can be realized for various decompositions that can be facilitated by communication system 10. RAN 80 is not shown in FIG. 9 in order to illustrate other features of communication system 10.

FIG. 9 includes RAN orchestration system 14 including RAN orchestration function 30 and transport network 20, which may interface with transport management function 22, and locations LOC 10-19 at which each of a number of RF termination points 18.1-18.10, respectively, is deployed. RF termination points 18.1-18.10 are illustrated as generic towers with associated generic network elements. Candidate locations LOC 1-9 can be associated with any network elements of RAN 80 interconnected among transport network 20 such as, for example, other RF termination points, data centers, servers, controllers, or any other infrastructure that may be provided for RAN 80.

For FIG. 9, candidate locations LOC 1, LOC 2, LOC 4, LOC 6, LOC 7 and LOC 10-19 for RF termination points 18.1-18.10, respectively, each situated on the perimeter of the dash-dot lined circle representing transport network 20, candidate locations LOC 3, LOC 8 and LOC 9 within the dash-dot lined circle representing transport network 20, as well as RAN orchestration system 14 and transport management function 22 are assumed to be interconnected via transport network 20. In one example case for FIG. 9, RF termination points 18.1 and 18.6-18.10 may be assumed to be associated with a first cluster of RF termination points interconnected among transport network 20 for a first given geographic area and RF termination points 18.2-18.5 may be assumed to be associated with a second cluster of RF termination points interconnected among transport network 20 for a second geographic area.

During operation, transport management function 22, through one or more transport network 20 characterizations, may generate one or more table(s) 910 indicating transport network impairments between each location LOC 1-19 interconnected among transport network 20.

Transport network impairments indicated in table(s) 910 (and any other information such as UE demand, etc. that may be gathered by RAN orchestration function 30) can be used by RAN orchestration function 30 to determine an optimized decomposition of network functionality for RAN 80 into the particular set of VNF(s) 514 for one or more RAN controller(s) 512, the particular first tier set of VNF(s) 550 for one or more first tier radio aggregator(s) 506, the particular second tier set of VNF(s) 570 for one or more second tier radio aggregator(s) 508 and a particular set of VNF(s) 60 for each RF termination point 18.1-18.10 and to identify an optimal location(s) at which to instantiate the particular set of VNF(s) 514 for RAN controller(s) 512, the particular first tier set of VNF(s) 550 for one or more first tier radio aggregator(s) 506 and the particular second tier set of VNF(s) 570 for one or more second tier radio aggregator(s) 508 from candidate locations LOC 1-9 based on one or more orchestration policies that may be configured for RAN orchestration function 30.

Consider one example case in which, based on a given characterization of transport network 20 impairments included in table(s) 910 and/or UE demand, RAN orchestration function 30 identifies candidate location LOC 9 as an optimal location (e.g., based on being at an approximate geographic center among LOC 10-19 for RF termination points 18.1-18.10) at which to instantiate the particular set of VNF(s) 514 for one RAN controller 512 to perform higher level (e.g., RRC, S1/X2 signaling, protocol signaling, etc.) operations for RF termination points 18.1-18.10. RAN orchestration function 30 can further identify candidate location LOC 8 as an optimal location at which to instantiate a first instance of the particular first tier set of VNF(s) 550 for one first tier radio aggregator 506 to perform PDCP operations for the first cluster of RF termination points 18.1 and 18.6-18.10 and can identify candidate location LOC 3 as an optimal location at which to instantiate a second instance of the particular first tier set of VNF(s) 550 for another first tier radio aggregator 506 to perform PDCP operations for the second cluster of RF termination points 18.2-18.5.

In one example, RAN orchestration function 30 may further identify each of candidate locations LOC 1, LOC 6 and LOC 7 as optimal locations at which to instantiate respective instances of the particular second tier set of VNF(s) 570 for three second tier radio aggregators 508 or, in another example, may identify any subset of these locations as optimal locations at which to instantiate the particular second tier set of VNF(s) 570 for one or two second tier radio aggregator(s) 508. For example, RAN orchestration function 30 may identify candidate location LOC 7 as an optimal location at which to instantiate one instance of the particular second tier set of VNF(s) 570 for a single, second tier radio aggregator 508 to serve RF termination points 18.1 and 18.6-18.10 for the first cluster.

In another example, RAN orchestration function 30 could identify candidate location LOC 1 as an optimal location at which to instantiate one instance of the particular second tier set of VNF(s) 570 for a single, second tier radio aggregator 508 to serve RF termination points 18.1 and 18.10 (e.g., RF termination points 18.1 and 18.10 could have increased UE demand compared to other RF termination points in the first cluster) and could identify candidate location LOC 66 as an optimal location at which to instantiate another instance of the particular second tier set of VNF(s) 570 for another second tier radio aggregator 508 to serve RF termination points 18.6-18.9 (e.g., which may have lower UE demand). Similarly, RAN orchestration function 30 can distribute the particular second set of VNF(s) 570 across one or more candidate locations LOC 2, LOC 4 and LOC 5 for the second cluster of RF termination points 18.2-18.5 based on UE demand in addition to or separate from transport network 20 characterizations.

Thus, as illustrated in the various examples described for FIGS. 6A-6B and 7-9, communication system 10, via RAN orchestration function 30 can facilitate the dynamic realization of different RAN decompositions for a multitude of orchestration policies, transport network characterizations and/or UE demand.

Figure 10:
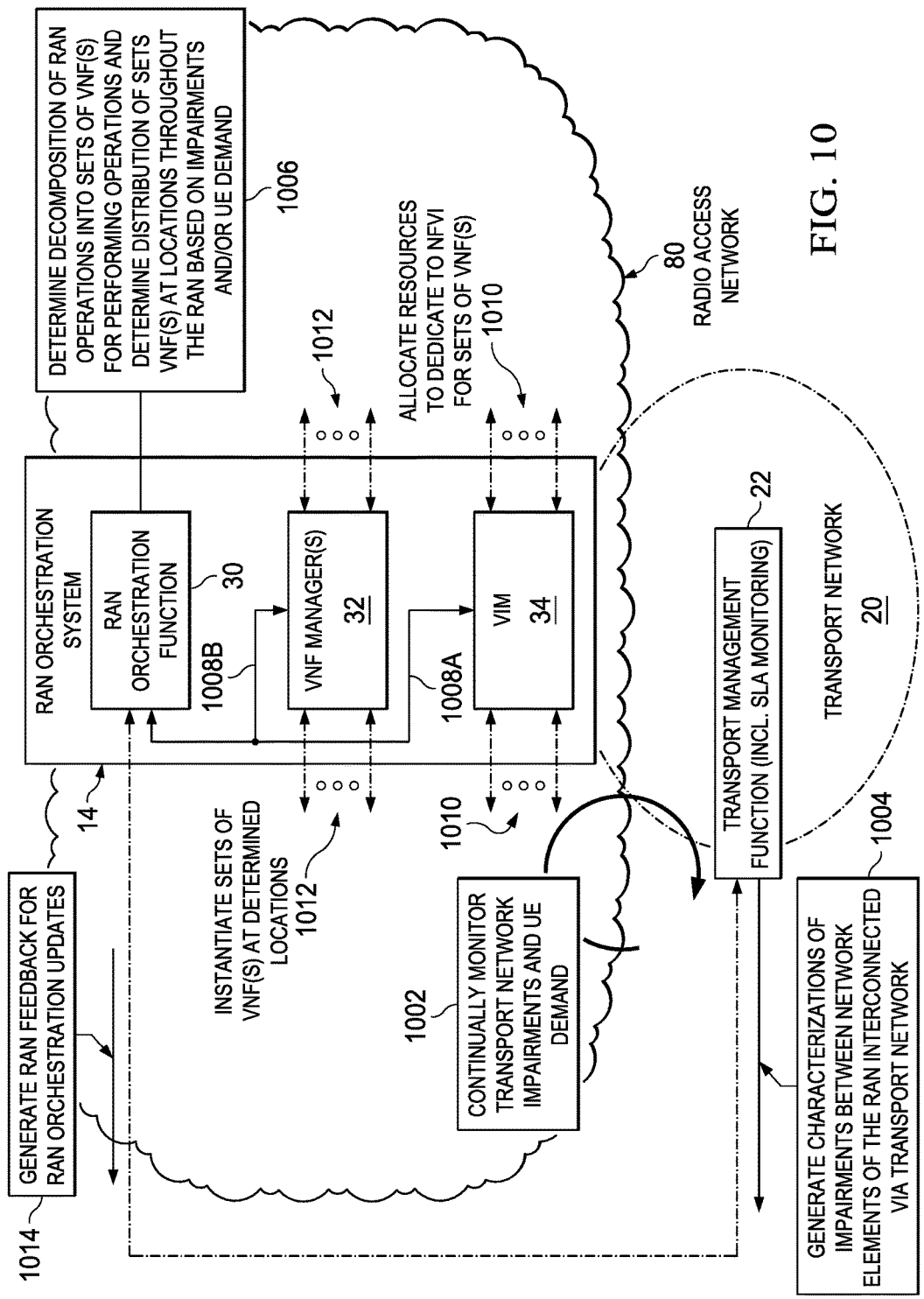
FIG. 10 is a simplified block diagram illustrating example details associated with various operations that can be performed to facilitate dynamic RAN orchestration in accordance one potential embodiment of the communication system.

Turning to FIG. 10, FIG. 10 is a simplified block diagram illustrating example details associated with various operations that can be performed to facilitate dynamic RAN orchestration in accordance with one potential embodiment of communication system 10. FIG. 10 includes RAN 80, RAN Orchestration System 14, transport network 20 and transport management function 22. RAN Orchestration System 14 includes RAN orchestration function 30, VNF manager(s) 32 and VIM 34.

In at least one embodiment, communication system 10, as shown at 1002, may continually monitor transport network 20 impairments (e.g., through characterizations of transport network 20 generated via transport management function 22 and communicated to RAN orchestration function 30) and/or may continually monitor UE demand within RAN 80.

At any time, as shown at 1004, transport management function 22 may generate characterizations of impairments present between various locations of network elements of RAN 80 (e.g., locations of one or more RF termination points and locations of other network elements) interconnected via transport network 20 and may communicate the impairments to RAN orchestration function 30. At 1006, RAN orchestration function 30 may determine a decomposition of RAN 80 operations into sets of VNF(s), for example, sets of VNF(s) 40, 60, 510, 514, 530, 550, 570 or any other sets of VNF(s) for any other decompositions that may be configured for RAN orchestration function 30 for one or more orchestration policies based on the characterization of impairments received from transport management function 22 and/or UE demand. Further at 1006, RAN orchestration function may identify a distribution of the determined sets of VNF(s) among one or more candidate location(s) throughout RAN 80 (e.g., for one or more candidate location(s) for sets of VNF(s) not associated with RF termination points) based on the characterization of impairments received from transport management function 22 and/or UE demand in relation to one or more orchestration policies.

At 1008A, RAN orchestration function may command VIM 34 to allocate virtualization enablers, resources, etc. that can be dedicated to NFVI for the sets of VNF(s) instantiated at various locations (e.g., at one or more identified candidate location(s) and at locations of RF termination point(s) 18). The allocation can be performed at can be performed by VIM 34 at 1010. At 1008B, RAN orchestration function may command VNF manager(s) 32 to instantiate the sets of VNF(s) at various locations (e.g., identified candidate locations and location(s) of RF termination point(s) 18). At 1012, VNF manager(s) 32 may instantiate the sets of VNF(s).

Communication system 10 may be continuing to monitor transport network 20 impairments (e.g., through characterizations of transport network 20 generated via transport management function 22 and communicated to RAN orchestration function 30) and/or UE demand among various locations within RAN 80 at 1002. In some embodiments, as shown at 1014, RAN orchestration function 30 may provide RAN feedback information to transport management function 22, which may include decomposition information associated with the sets of VNFs currently instantiated for a given decomposition, location information associated with the distribution of the sets of VNF(s) at various locations throughout RAN 80 and/or other information associated with operation of RAN 80.

Figure 11:
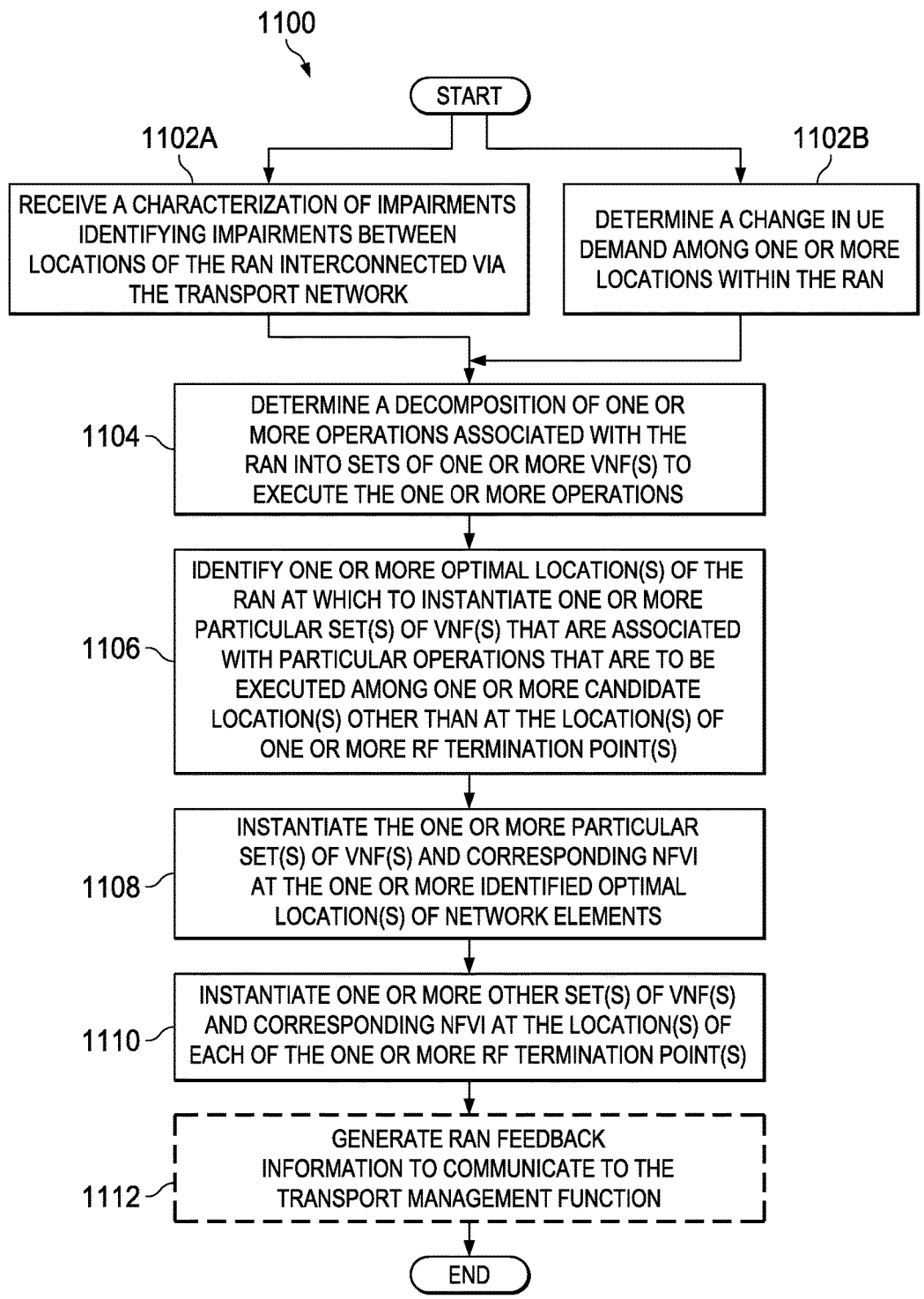
FIG. 11 is simplified flow diagram illustrating example operations that can be associated with providing dynamic RAN orchestration in accordance with one potential embodiment of the communication system.

Turning to FIG. 11, FIG. 11 is a simplified flow diagram illustrating example operations 1100 that can be associated with providing dynamic RAN orchestration in accordance with one potential embodiment of communication system 10.

At any time, transport management function 22 may generate a characterization of impairments between one or more locations of network elements associated with RAN 80

(e.g., a fronthaul characterization) interconnected via transport network 20. Thus, in some embodiments, operations can begin at 1102A in which RAN orchestration function may receive a characterization of impairments identifying impairments between locations of network elements associated with RAN 80 that are interconnected via transport network 20. In various embodiments, network elements associated with RAN 80 can include one or more RF termination point(s) (e.g., RF termination point(s) 18) one or more data centers, servers, controllers, combinations thereof or the like that can be interconnected via transport network 20 to facilitate operations associated with RAN 80. In some embodiments, the characterization of impairments can be one or more table(s) identifying impairments (e.g., throughput, latency/jitter, loss, etc.) between the one or more locations.

In some embodiments, as shown at 1102B, RAN orchestration function 30 can determine a change in UE demand (e.g., demand associated with one or more UE 12a-12c) among one or more locations within the RAN, which can trigger subsequent operations to determine a decomposition and/or distribution of set(s) of VNF(s) among various locations of the RAN. In various embodiments, a change in UE demand can be determined by monitoring UE connectivity at one or more RF termination point locations, monitoring UE traffic flows across one or more network elements, monitoring UE sessions across one or more network elements, combinations thereof or the like. In various embodiments operations 1102A and 1102B can be performed in parallel.

At 1104, the operations can include RAN orchestration function 30 determining a decomposition of one or more operations associated with RAN 80 into sets of one or more VNF(s) to execute the one or more operations. In some embodiments, the determining can include comparing a characterization of impairments received at 1102A to one or more orchestration policies configured for RAN orchestration function 30 in order to determine particular sets of VNF(s) for a particular decomposition. In still some embodiments, the determining can include comparing a characterization of impairments received at 1102 in combination with a change in UE demand to one or more orchestration policies in order to determine particular sets of VNF(s) for a particular decomposition. In still some embodiments, the determining can include comparing the changes in UE demand to one or more orchestration policies in order to determine particular sets of VNF(s) for a particular decomposition.

In some embodiments, the determining can include determining a decomposition into a first set of one or more VNF(s) associated with first operations to be executed for one or more RAN controllers (e.g., RAN controller(s) 16) and a second set of VNFs associated with operations to be executed for the at least one RF termination point (e.g., a given RF termination point 18).

In still some embodiments, the determining can include determining a decomposition into a first set of VNFs associated with first operations to be executed for one or more RAN controller(s) 502, a second set of VNFs associated with second operations to be executed for one or more radio aggregators (e.g., radio aggregator(s) 504 and a third set of VNFs associated with operations to be executed for the at least one RF termination point (e.g., a given RF termination point 18). In still some embodiments, the determining can include determining a decomposition into a set of VNF(s) 514 associated with first higher level operations to be executed for one or more RAN controller(s) 512, a first tier set of VNF(s) associated with one or more first tier operations (e.g., PDCP operations) to be executed for one or more first tier radio aggregator(s) (e.g., first tier radio aggregator(s) 506) and a second tier set of VNF(s) associated with one or more second tier operations (e.g., RLC/MAC operations) to be executed for one or more second tier radio aggregator(s) (e.g., second tier radio aggregator(s) 508).

At 1106, the operations can include identifying one or more optimal location(s) at which to instantiate (e.g., distribute) one or more particular set(s) of VNF(s) that are associated with particular operations that are to be executed among one or more candidate location(s) of network elements other than at the location(s) of one or more RF termination point(s) based on the characterization of impairments and/or UE demand in relation to one or more orchestration policies configured for RAN orchestration function 30. In some embodiments, the identifying can be based on the characterization of impairments received in 1102A and/or the determination of a change in UE demand determined at 1102B compared to orchestration policies configured with distribution criteria indicating impairment conditions required for certain distributions among various locations. In still some embodiments, the identifying can be based on network element capabilities for network elements located at various locations, which can be configured for certain orchestration policies.

At 1108, the operations can include instantiating the one or more particular set(s) of VNF(s) and corresponding NFVI at the one or more identified optimal location(s) of network elements associated with the RAN. At 1110, the operations can include instantiating one or more other set(s) of VNF(s) and corresponding NFVI at the locations of each of one or more RF termination points within the RAN and the operations may end. In some embodiments, as shown at 1112, RAN orchestration function 30 can generate RAN feedback information to communicate to transport management function 22.

Regarding the internal structure of communication system 10, appropriate software and/or hardware, physical and/or virtualized is being provisioned in RAN orchestration system 14, including RAN orchestration function 30, VNF manager(s) 32 and VIM 34; transport management function 22; one or more RAN controller(s) 16 and one or more RF termination point(s) 18 [as shown in FIGS. 1 and 4]; one or more RAN controller(s) 502 and one or more radio aggregator(s) 504 [as shown in FIG. 5A]; one or more RAN controller(s) 512, one or more first tier radio aggregator(s) 506 and one or more second tier radio aggregator(s) 508 [as shown in FIG. 5B] to facilitate dynamic RAN orchestrations for various virtualized RAN 80 architectures in a network environment (e.g., for networks such as those illustrated in FIGS. 1, 4, 5A-5B, 6A and 7-9). Note that in certain examples, certain storages can be consolidated with memory elements (or vice versa), or the storage can overlap/exist in any other suitable manner.

In one example implementation, RAN orchestration system 14, including RAN orchestration function 30, VNF manager(s) 32 and VIM 34; transport management function 22; one or more RAN controller(s) 16 and one or more RF termination point(s) 18 [e.g., as shown in FIGS. 1 and 4]; one or more RAN controller(s) 502 and one or more radio aggregator(s) 504 [as shown in FIG. 5A] and one or more RAN controller(s) 512, one or more first tier radio aggregator(s) 506 and one or more second tier radio aggregator(s) 508 [as shown in FIG. 5B] are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate dynamic RAN orchestration operations, as outlined herein. In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

Each of RAN orchestration system 14, including RAN orchestration function 30, VNF manager(s) 32 and VIM 34; transport management function 22; one or more RAN controller(s) 16 and one or more RF termination point(s) 18 [as shown in FIGS. 1 and 4]; one or more RAN controller(s) 502 and one or more radio aggregator(s) 504 [as shown in FIG. 5A]; one or more RAN controller(s) 512; one or more first tier radio aggregator(s) 506 and one or more second tier radio aggregator(s) 508 [as shown in FIG. 5B] can include one or more memory elements [e.g., as shown in FIG. 4] for storing information to be used in achieving the dynamic RAN orchestration operations, as outlined herein. Additionally, each of these devices may include one or more processors, including hardware processors, multi-core processors, etc. that can execute software or algorithms to perform dynamic RAN orchestration activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'.

Information being tracked or sent to RAN orchestration system 14, including RAN orchestration function 30, VNF manager(s) 32 and VIM 34; transport management function 22; one or more RAN controller(s) 16 and one or more RF termination point(s) 18 [as shown in FIGS. 1 and 4]; one or more RAN controller(s) 502 and one or more radio aggregator(s) 504 [as shown in FIG. 5A] and/or one or more RAN controller(s) 512, one or more first tier radio aggregator(s) 506 and one or more second tier radio aggregator(s) 508 [as shown in FIG. 5B] could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the dynamic RAN orchestration operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [e.g., as shown in FIG. 4] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [e.g., as shown in FIG. 4] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Note that in this Specification, references to various features (e.g., elements, structures, modules, functions, frameworks, resources, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, function or engine as referred to herein this Specification, can be inclusive of an executable file comprising instructions that can be understood and processed on a computer, and may further include library modules, functions or engines loaded during execution, object files, system files, hardware logic, software logic, or any other executable modules, functions or engines.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate operations described herein, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
  receiving, by a radio access network (RAN) orchestration function, a characterization of impairments between a plurality of locations interconnected by a transport network, wherein the plurality of locations includes a location associated with at least one radio frequency (RF) termination point and a plurality of other locations associated with network elements of a radio access network (RAN);
  determining, based at least in part on the characterization of impairments between the plurality of locations interconnected by the transport network, a decomposition of one or more operations associated with the RAN into a first set of virtualized network functions (VNFs) associated with first operations to be executed for one or more RAN controllers and a second set of VNFs associated with second operations to be executed for the at least one RF termination point, wherein the first operations are associated, at least in part, with Layer 2 (L2) RAN operations and the second operations are associated, at least in part, with Layer 1 (L1) RAN operations associated with the at least one RF termination point;
  instantiating the first set of VNFs at one or more particular locations of the plurality of other locations associated with the network elements of the RAN interconnected by the transport network; and
  instantiating the second set of VNFs at the location of the at least one RF termination point, wherein the first set of VNFs and the second set of VNFs are instantiated at different locations within the RAN.

2. The method of claim 1, further comprising:
  configuring a plurality of orchestration policies for the RAN orchestration function, wherein each orchestration policy identifies a particular decomposition of one or more operations associated with the RAN into a particular first set of VNFs and a particular second set of VNFs for different impairments that can exist between the plurality of locations interconnected by the transport network.

3. The method of claim 2, wherein determining the decomposition further includes comparing the received characterization of impairments to the configured orchestration policies to determine the decomposition into the first set of VNFs and the second set of VNFs.

4. The method of claim 1, further comprising:
  identifying, from the plurality of other locations associated with the network elements of the RAN, the one or more particular locations at which to instantiate the first set VNFs for each of the one or more RAN controllers based, at least in part, on the characterization of impairments.

5. The method of claim 4, wherein identifying the one or more particular locations at which to instantiate the first set of VNFs for each of the one or more RAN controllers further includes determining network element capabilities at the plurality of other locations associated with the network elements of the RAN.

6. The method of claim 5, further comprising:
  configuring a plurality of orchestration policies for the RAN orchestration function, wherein each orchestration policy indicates network element capabilities of each of the network elements of the RAN for executing one or more operations for associated with the RAN.

7. The method of claim 1, further comprising:
  determining a change in user equipment demand (UE) by the RAN orchestration function at one or more of: the location associated with at least one radio frequency (RF) termination point; and the plurality of other locations associated with the network elements of a the RAN.

8. The method of claim 7, wherein a change in UE demand can include at least one of:
  a change in location of one or more UE among one or more RF termination points within the RAN;
  a change in UE density among one or more RF termination points within the RAN;
  service type demand for one or more UE within the RAN; and
  priority of access for one or more UE among one or more RF termination points within the RAN.

9. The method of claim 8, wherein, based, at least in part, on determining a change in UE demand, the RAN orchestration function performs one or more of:
  providing admission control to one or more RF termination points;
  updating an allowable number of calls that can be supported by one or more RF termination points;
  updating an allowable number of radio access bearer types that can be accepted by one or more RF termination points;
  determining another decomposition of the one or more operations associated with the RAN into another first set of VNFs and another second set of VNFs;
  determining a distribution of a another first set of VNFs among the plurality of other locations associated with the network elements of the RAN;
  bringing one or more RF termination points online; and
  pushing one or more RF termination points offline.

10. The method of claim 1, wherein the first set of VNFs or the second set of VNFs includes at least one of: a virtualized Packet Data Convergence Protocol (PDCP) function; a virtualized Radio Link Control (RLC) function; a virtualized Media Access Control (MAC) function; a virtualized Radio Resource Control (RRC) function; and a virtualized physical layer (PHY) function.

11. One or more non-transitory tangible media encoding logic that includes instructions for execution by a processor, wherein the execution causes the processor to perform operations, comprising:
receiving, by a radio access network (RAN) orchestration function, a characterization of impairments between a plurality of locations interconnected by a transport network, wherein the plurality of locations includes a location associated with at least one radio frequency (RF) termination point and a plurality of other locations associated with network elements of a radio access network (RAN);
determining, based at least in part on the characterization of impairments between the plurality of locations interconnected by the transport network, a decomposition of one or more operations associated with the RAN into a first set of virtualized network functions (VNFs) associated with first operations to be executed for one or more RAN controllers and a second set of VNFs associated with second operations to be executed for the at least one RF termination point, wherein the first operations are associated, at least in part, with Layer 2 (L2) RAN operations and the second operations are associated, at least in part, with Layer 1 (L1) RAN operations associated with the at least one RF termination point;
instantiating the first set of VNFs at one or more particular locations of the plurality of other locations associated with the network elements of the RAN interconnected by the transport network; and
instantiating the second set of VNFs at the location of the at least one RF termination point, wherein the first set of VNFs and the second set of VNFs are instantiated at different locations within the RAN.

12. The media of claim 11, wherein the execution causes the processor to perform operations, comprising:
configuring a plurality of orchestration policies for the RAN orchestration function, wherein each orchestration policy identifies a particular decomposition of one or more operations associated with the RAN into a particular first set of VNFs and a particular second set of VNFs for different impairments that can exist between the plurality of locations interconnected by the transport network.

13. The media of claim 12, wherein determining the decomposition further includes comparing the received characterization of impairments to the configured orchestration policies to determine the decomposition into the first set of VNFs and the second set of VNFs.

14. The media of claim 11, wherein the execution causes the processor to perform operations, comprising:
identifying, from the plurality of other locations associated with the network elements of the RAN, the one or more particular locations at which to instantiate the first set VNFs for each of the one or more RAN controllers based, at least in part, on the characterization of impairments.

15. The media of claim 14, wherein identifying the one or more particular locations at which to instantiate the first set of VNFs for each of the one or more RAN controllers further includes determining network element capabilities at the plurality of other locations associated with the network elements of the RAN.

16. The media of claim 15, wherein the execution causes the processor to perform operations, comprising:
configuring a plurality of orchestration policies for the RAN orchestration function, wherein each orchestration policy indicates network element capabilities of each of the network elements of the RAN for executing one or more operations for associated with the RAN.

17. The media of claim 11, wherein the execution causes the processor to perform operations, comprising:
determining a change in user equipment demand (UE) by the RAN orchestration function at one or more of: the location associated with at least one radio frequency (RF) termination point; and the plurality of other locations associated with the network elements of the RAN.

18. A system comprising:
a Radio Access Network (RAN) orchestration system comprising:
at least one memory element;
at least one processor; and
a RAN orchestration function adapted when executed by the at least one processor to:
receive a characterization of impairments between a plurality of locations interconnected by a transport network, wherein the plurality of locations includes a location associated with at least one radio frequency (RF) termination point and a plurality of other locations associated with network elements of a radio access network (RAN);
determine, based at least in part on the characterization of impairments between the plurality of locations interconnected by the transport network, a decomposition of one or more operations associated with the RAN into a first set of virtualized network functions (VNFs) associated with first operations to be executed for one or more RAN controllers and a second set of VNFs associated with second operations to be executed for the at least one RF termination point, wherein the first operations are associated, at least in part, with Layer 2 (L2) RAN operations and the second operations are associated, at least in part, with Layer 1 (L1) RAN operations associated with the at least one RF termination point;
instantiate the first set of VNFs at one or more particular locations of the plurality of other locations associated with the network elements of the RAN interconnected by the transport network; and
instantiate the second set of VNFs at the location of the at least one RF termination point, wherein the first set of VNFs and the second set of VNFs are instantiated at different locations within the RAN.

19. The system of claim 18, wherein the RAN orchestration function is further adapted when executed by the at least one processor to:
identify, from the plurality of other locations associated with the network elements of the RAN, the one or more particular locations at which to instantiate the first set VNFs for each of the one or more RAN controllers based, at least in part, on the characterization of impairments.

20. The system of claim 19, wherein identifying the one or more particular locations at which to instantiate the first set of VNFs for each of the one or more RAN controllers further includes determining network element capabilities at the plurality of other locations associated with the network elements of the RAN.

\* \* \* \* \*